(12) United States Patent
Musgrove et al.

(10) Patent No.: US 9,400,838 B2
(45) Date of Patent: Jul. 26, 2016

(54) SYSTEM AND METHOD FOR SEARCHING FOR A QUERY

(75) Inventors: Timothy A. Musgrove, Morgan Hill, CA (US); Robin H. Walsh, San Francisco, CA (US)

(73) Assignee: TEXTDIGGER, INC., Morgan Hill, CA (US)

( * ) Notice: Subject to any disclaimer, the term of this patent is extended or adjusted under 35 U.S.C. 154(b) by 0 days.

(21) Appl. No.: 11/401,448

(22) Filed: Apr. 11, 2006

(65) Prior Publication Data
US 2007/0011154 A1    Jan. 11, 2007

Related U.S. Application Data

(60) Provisional application No. 60/669,922, filed on Apr. 11, 2005, provisional application No. 60/686,929, filed on Jun. 3, 2005.

(51) Int. Cl.
*G06F 17/30* (2006.01)
*G06F 17/27* (2006.01)

(52) U.S. Cl.
CPC ...... *G06F 17/30672* (2013.01); *G06F 17/2785* (2013.01); *G06F 17/2795* (2013.01); *G06F 17/30864* (2013.01)

(58) Field of Classification Search
CPC ................ G06F 17/30442; G06F 17/30684
See application file for complete search history.

(56) References Cited

U.S. PATENT DOCUMENTS

| | | | |
|---|---|---|---|
| 4,839,853 A | 6/1989 | Deerwester et al. | ......... 707/5 |
| 5,210,868 A * | 5/1993 | Shimada et al. | |
| 5,237,503 A | 8/1993 | Bedecarrax et al. | ......... 704/10 |
| 5,278,980 A | 1/1994 | Pedersen et al. | |
| 5,301,109 A | 4/1994 | Landauer et al. | |
| 5,317,507 A | 5/1994 | Gallant | ......... 715/532 |
| 5,331,556 A | 7/1994 | Black, Jr. et al. | ......... 704/9 |
| 5,418,948 A | 5/1995 | Turtle | |
| 5,541,836 A | 7/1996 | Church et al. | ......... 704/7 |
| 5,544,049 A | 8/1996 | Henderson et al. | |

(Continued)

FOREIGN PATENT DOCUMENTS

| | | |
|---|---|---|
| EP | 1846815 | 10/2007 |
| EP | 1851616 | 11/2007 |

(Continued)

OTHER PUBLICATIONS

Stamou, Sofia and Dimitris Christodoulakis, "Retrieval Efficiency of Normalized Query Expansion." Lecture Notes in Computer Science 3406 (2005): 604-607.*

(Continued)

*Primary Examiner* — Syed Hasan
(74) *Attorney, Agent, or Firm* — Nixon Peabody LLP

(57) ABSTRACT

A search system for searching for electronic documents, and providing a search result in response to a search query is provided. The search system includes a processor, a user interface module adapted to receive a search query from a user, the search query having at least one search query term, and a query processing module that analyzes the search query term to identify candidate synonym words. The query processing module also determines which of the candidate synonym words are equivalent terms to the search query term, and in a same sense as the search query term. In addition, the search system includes a search engine that executes a search based on the search query term and the equivalent terms.

31 Claims, 3 Drawing Sheets

(56) References Cited

U.S. PATENT DOCUMENTS

| | | | |
|---|---|---|---|
| 5,619,709 A | 4/1997 | Caid et al. | 715/532 |
| 5,675,819 A | 10/1997 | Schuetze | |
| 5,694,592 A | 12/1997 | Driscoll | 707/3 |
| 5,797,123 A | 8/1998 | Chou et al. | |
| 5,873,056 A | 2/1999 | Liddy et al. | 704/9 |
| 5,913,215 A | 6/1999 | Rubinstein et al. | |
| 5,926,811 A | 7/1999 | Miller et al. | 707/5 |
| 5,991,755 A | 11/1999 | Noguchi et al. | |
| 5,999,664 A | 12/1999 | Mahoney et al. | |
| 6,006,225 A | 12/1999 | Bowman et al. | |
| 6,029,167 A | 2/2000 | Evans | |
| 6,070,157 A | 5/2000 | Jacobson et al. | |
| 6,070,158 A | 5/2000 | Kirsch et al. | |
| 6,081,774 A | 6/2000 | de Hita et al. | 704/9 |
| 6,088,692 A | 7/2000 | Driscoll | 707/5 |
| 6,101,492 A | 8/2000 | Jacquemin et al. | 707/3 |
| 6,128,613 A | 10/2000 | Wong et al. | |
| 6,161,084 A | 12/2000 | Messerly et al. | 704/9 |
| 6,169,986 B1 | 1/2001 | Bowman et al. | |
| 6,182,066 B1 | 1/2001 | Marques | |
| 6,189,002 B1 | 2/2001 | Roitblat | |
| 6,256,629 B1 | 7/2001 | Sproat et al. | 707/6 |
| 6,269,368 B1 | 7/2001 | Diamond | 707/6 |
| 6,360,215 B1* | 3/2002 | Judd et al. | 707/3 |
| 6,405,190 B1 | 6/2002 | Conklin | 707/3 |
| 6,453,315 B1 | 9/2002 | Weissman et al. | |
| 6,460,029 B1 | 10/2002 | Fries et al. | 707/5 |
| 6,460,034 B1 | 10/2002 | Wical | 707/5 |
| 6,480,843 B2 | 11/2002 | Li | 707/5 |
| 6,510,406 B1 | 1/2003 | Marchisio | 704/9 |
| 6,519,586 B2 | 2/2003 | Anick et al. | |
| 6,523,026 B1 | 2/2003 | Gillis | 707/3 |
| 6,523,028 B1 | 2/2003 | DiDomizio et al. | |
| 6,601,026 B2 | 7/2003 | Appelt et al. | |
| 6,647,383 B1 | 11/2003 | August et al. | 707/3 |
| 6,665,681 B1 | 12/2003 | Vogel | |
| 6,675,159 B1 | 1/2004 | Lin et al. | 707/3 |
| 6,684,205 B1 | 1/2004 | Modha et al. | 707/3 |
| 6,711,585 B1 | 3/2004 | Copperman et al. | |
| 6,732,092 B2 | 5/2004 | Lucas et al. | |
| 6,735,583 B1 | 5/2004 | Bjarnestam et al. | |
| 6,766,316 B2 | 7/2004 | Caudill et al. | 707/3 |
| 6,766,320 B1 | 7/2004 | Wang et al. | |
| 6,772,150 B1 | 8/2004 | Whitman et al. | |
| 6,816,858 B1 | 11/2004 | Coden et al. | |
| 6,820,079 B1 | 11/2004 | Evans | |
| 6,823,331 B1 | 11/2004 | Abu-Hakima | |
| 6,847,979 B2 | 1/2005 | Allemang et al. | |
| 6,865,575 B1 | 3/2005 | Smith et al. | 707/10 |
| 6,947,930 B2 | 9/2005 | Anick et al. | |
| 7,024,400 B2 | 4/2006 | Tokuda et al. | |
| 7,082,426 B2 | 7/2006 | Musgrove et al. | |
| 7,089,236 B1 | 8/2006 | Stibel | |
| 7,249,121 B1 | 7/2007 | Bharat et al. | |
| 7,254,576 B1 | 8/2007 | Hamilton | |
| 7,424,486 B2 | 9/2008 | Whitman et al. | |
| 7,437,670 B2 | 10/2008 | Day et al. | |
| 7,451,395 B2 | 11/2008 | Brants et al. | |
| 7,620,651 B2 | 11/2009 | Chea et al. | |
| 7,711,679 B2 | 5/2010 | Patterson | |
| 7,809,548 B2 | 10/2010 | Mihalcea et al. | |
| 7,844,589 B2 | 11/2010 | Wang et al. | |
| 7,856,441 B1 | 12/2010 | Kraft et al. | |
| 7,925,610 B2* | 4/2011 | Elbaz et al. | 706/55 |
| 8,055,669 B1 | 11/2011 | Singhal et al. | |
| 8,265,925 B2 | 9/2012 | Aarskog | |
| 8,694,530 B2 | 4/2014 | Musgrove | |
| 8,732,197 B2 | 5/2014 | Musgrove | |
| 8,862,573 B2 | 10/2014 | Musgrove | |
| 2001/0037324 A1 | 11/2001 | Agrawal et al. | |
| 2001/0049677 A1 | 12/2001 | Talib et al. | |
| 2002/0046019 A1* | 4/2002 | Verhagen et al. | 704/9 |
| 2003/0018659 A1 | 1/2003 | Fuks et al. | |
| 2003/0037041 A1 | 2/2003 | Hertz | 707/1 |
| 2003/0050915 A1 | 3/2003 | Allemang et al. | |
| 2003/0115191 A1 | 6/2003 | Copperman et al. | |
| 2003/0126235 A1 | 7/2003 | Chandrasekar et al. | |
| 2003/0164844 A1 | 9/2003 | Kravitz et al. | |
| 2003/0187649 A1 | 10/2003 | Logan et al. | |
| 2003/0187837 A1* | 10/2003 | Culliss | 707/3 |
| 2003/0212654 A1 | 11/2003 | Harper et al. | |
| 2003/0217047 A1 | 11/2003 | Marchisio | |
| 2003/0217052 A1 | 11/2003 | Rubenczyk et al. | 707/3 |
| 2003/0233224 A1* | 12/2003 | Marchisio et al. | 704/4 |
| 2004/0030686 A1 | 2/2004 | Cardno et al. | |
| 2004/0064447 A1* | 4/2004 | Simske et al. | 707/5 |
| 2004/0133418 A1* | 7/2004 | Turcato et al. | 704/9 |
| 2004/0139059 A1 | 7/2004 | Conroy et al. | |
| 2004/0143600 A1 | 7/2004 | Musgrove et al. | |
| 2004/0205448 A1 | 10/2004 | Grefenstette et al. | |
| 2004/0236736 A1 | 11/2004 | Whitman et al. | |
| 2005/0015366 A1 | 1/2005 | Carrasco et al. | 707/3 |
| 2005/0071332 A1 | 3/2005 | Ortega et al. | |
| 2005/0080614 A1 | 4/2005 | Bennett | 707/3 |
| 2005/0080776 A1 | 4/2005 | Colledge et al. | 707/3 |
| 2005/0080780 A1* | 4/2005 | Colledge et al. | 707/4 |
| 2005/0165600 A1 | 7/2005 | Kasravi et al. | |
| 2005/0216447 A1 | 9/2005 | Talib et al. | |
| 2005/0267871 A1 | 12/2005 | Marchisio et al. | |
| 2005/0283473 A1 | 12/2005 | Rousso et al. | |
| 2006/0004747 A1 | 1/2006 | Weare | |
| 2006/0161520 A1 | 7/2006 | Brewer et al. | |
| 2006/0235843 A1 | 10/2006 | Musgrove | |
| 2006/0235870 A1 | 10/2006 | Musgrove | |
| 2007/0005590 A1 | 1/2007 | Thrasher | |
| 2007/0078832 A1 | 4/2007 | Ott, IV et al. | |
| 2007/0088695 A1 | 4/2007 | Bleyendaal et al. | |
| 2007/0174041 A1 | 7/2007 | Yeske | |
| 2007/0244855 A1 | 10/2007 | Bates | |
| 2007/0250487 A1 | 10/2007 | Reuther | |
| 2007/0282811 A1 | 12/2007 | Musgrove | |
| 2008/0021925 A1 | 1/2008 | Sweeney | |
| 2008/0059451 A1 | 3/2008 | Musgrove | |
| 2008/0097985 A1 | 4/2008 | Olstad et al. | |
| 2008/0154875 A1 | 6/2008 | Morscher et al. | |
| 2009/0031236 A1 | 1/2009 | Robertson et al. | |
| 2009/0037457 A1 | 2/2009 | Musgrove | |
| 2009/0254540 A1 | 10/2009 | Musgrove et al. | |
| 2014/0207751 A1 | 7/2014 | Musgrove | |
| 2015/0074147 A1 | 3/2015 | Musgrove | |

FOREIGN PATENT DOCUMENTS

| | | |
|---|---|---|
| EP | 1875336 | 1/2008 |
| JP | 10-116290 | 6/1998 |
| JP | 2000-339169 | 8/2000 |
| JP | 2000250919 | 9/2000 |
| JP | 2001184358 | 6/2001 |
| JP | 2008529173 | 7/2008 |
| JP | 2008537225 | 9/2008 |
| JP | 2008-538019 | 10/2008 |
| WO | 2006086179 | 8/2006 |
| WO | 2006096260 | 9/2006 |
| WO | 2006110684 | 10/2006 |
| WO | 2007081681 | 7/2007 |
| WO | 2007114932 | 10/2007 |
| WO | 2008097891 | 8/2008 |
| WO | 2009059297 | 5/2009 |

OTHER PUBLICATIONS

"synset." WordNet® 3.0. Princeton University. Jun. 25, 2009. <Dictionary.com http://dictionary.reference.com/browse/synset>.*

G. Ramakrishnan, et al.; "Soft Word Sense Disambiguation"; Department of Computer Science and Engineering, Indian Institute of Tech., Mumbai, India; Dated GWC 2004; pp. 291-298; Masaryk University Brno, Dec. (2003).

E. Agirre, et al.; "Exploring Automatic Word Sense Disambiguation With Decision Lists and the Web"; Dated 2000; 9-pages; Donostia, Basque Country.

R. Bruce, et al.; "Word-Sense Disambiguation Using Decomposable Models"; Computer Research lab and Department of Computer Science New Mexico State University; 8-pages.

(56) References Cited

OTHER PUBLICATIONS

D. Yarowsky; "*Unsupervised Word Sense Disambiguation Rivaling Supervised Methods*"; Department of Computer and Information Science University of Pennsylvania; pp. 189-196.
M. Hearst; "*TextTiling: Segmenting Text into Multi-paragraph Subtopic Passages*"; Xerox PARC; pp. 33-64; Association for Computational Linguistics Dated 1997.
T. Musgrove; "*Search System with Query Refinement and Search Method*"; U.S. Appl. No. 11/648,901, filed Jan. 3, 2007.
T. Musgrove, et al.; "Method and System for Semantic Search and Retrieval of Electronic Documents"; U.S. Appl. No. 11/343,084, filed Jan. 31, 2006.
Timothy A. Musgrove et al., "Method and System for Semantic Search and Retrieval of Electronic Documents", U.S. Appl. No. 11/343,084, filed Jan. 31, 2006.
Ramakrishnan, G. et al., "Soft Word Sense Disambiguation". GWN 2004, 291-298, Masaryk University Brno, Brno, Czech Republic., December (2003).
Agirre, E. et al., "Exploring automatic word sense disambiguation with decision lists and the Web", *In Proceedings of the COLING 2000 Workshop on Semantic Annotation and Intelligent Content*, Saarbroken, Germany (2000).
Bruce, R. et al., "Word-Sense Disambiguation Using Decomposable Models", *Proceedings of the 32$^{nd}$ Annual Meeting of the Asssociation for Computational Linguistics*, 139-146 (1994).
Hearst, M., "TextTiling: Segmenting Text into Multi-paragraph Subtopic Passages", *Computational Linguistics*, 23(1): 33-64 (1997).
Yarowsky, D., "Unsupervised Word Sense Disambiguation Rivaling Supervised Methods", *Proceedings of the 33$^{rd}$ Annual Meeting of the Association for Computational Linguistics*, 189-196 (1995).
Dive Into Python, Chapter 9, XML Processing. Available at http://www.diveintopython.net/xml_processing/.
Alani, H. et al., "Associative and Spatial Relationships in Thesaurus-based Retrieval,", Proceedings of the Fourth European Conference on Research and Advanced Technology for Digital Libraries, 2000, pp. 1-10.
Barrington, L. et al., "Combining Audio Content and Social Context for Semantic Music Discovery", Paper presented at the 32nd Annual ACM SIGIR Conference, Jul. 19-23, 2009. http://cosmal.ucsd.edu/~lbarring/pubs/Barrington-SIGIR09.pdf.
Beneventano, D. et al., "Building an Integrated Ontology within SEWASIE System", Proceedings of the First International Workshop on Semantic Web and Data-bases (SWDB), 2003.
Budura, A. et al., "Neighborhood-based Tag Prediction", 6th Annual European Semantic Web Conference ESWC2009, vol. 5554 of Lecture Notes in Computer Science, Jun. 2009, pp. 608-622. http://people.csail.mit.edu/pcm/papers/TagPrediction.pdf.
Charniak, E., "A Maximum-Entropy-Inspired Parser", in Proceedings of NAACL-2000, pp. 132-139.
Chen, J-M. et al., "A Novel Approach for Enhancing Student Reading Comprehension and Assisting Teacher Assessment of Literacy", Computers & Education, vol. 55, Issue 3, Nov. 2010, pp. 1367-1382 (Abstract).
Collins, M.J., "A New Statistical Parser Based on Bigram Lexical Dependencies", Proceedings of the 34th Annual Meeting of the Association for Computational Linguistics, 1996, Santa Cruz, CA, pp. 184-191.
Durao, F. "Extending a Hybrid Tag-based Recommender System with Personalization", Paper presented, SAC '10 Proceedings of the 2010 ACM Symposium on Applied Computing, ACM New York, NY, USA 2010, pp. 1723-1727 (Abstract).
Fellbaum, C., ed., "WordNet: An Electronic Lexical Database," 1998, MIT Press, ISBN 0-262-06197-X.
Gildea, D. et al., "Automatic Labeling of Semantic Roles", Computational Linguistics, 2002, vol. 28, No. 3, pp. 1-45.
Guarino, N. "Formal Ontology and Information Systems", Proceedings of the International Conference on Formal Ontology in Information Systems (FOIS'98), Trento, Italy, 1998.
Gyllstrom, K. et al., "Seeing is Retrieving: Building Information Context from What the User Sees", Paper presented, IUI '08 Proceedings of the 13th International Conference on Intelligent User Interfaces, ACM New York, NY, USA 2008, pp. 189-198.
Hope, G. et al., "Convergence of Web 2.0 and Semantic Web: A Semantic Tagging and Searching System for Creating and Searching Blogs", International Conference on Semantic Computing, Sep. 1, 2007, pp. 201-208.
Itoh, H. et al., "Comparison and Superimposition Methods for Discovery of Relationship between Concept Systems", SIG-FAI-9904, Japan, Japanese Society for Artificial Intelligence, Mar. 21, 2000, pp. 65-70.
Joly, A. et al., "Contextual Recommendation of Social Updates, a Tag-based Framework", AMT, vol. 6335 of Lecture Notes in Computer Science, Springer 2010, pp. 436-447.
Leacock, C. et al., "Using Corpus Statistics and WordNet Relations for Sense Identification", Computational Linguistics, 24(1):147-165, 1998.
Lin, D., "Dependency-Based Evaluation of Minipar", In Workshop on the Evaluation of Parsing Systems, May 1998, Granada, Spain.
Martin, T., "Acquisition of Soft Taxonomies", IPMU-04, 2004.
Miller, G.A., "WordNet: A Lexical Database for English", Communications of the ACM, 38(11):39, 1995.
Nowviskie, B., "COLLEX: Semantic Collections & Exhibits for the Remixable Web", a preprint, Nov. 2005. http://www.nines.org/about/Nowviskie-Collex.pdf.
Sasumu, Akamine, "Flexible String Inversion Method for High-Speed Full-Text Search", Advanced Database Symposium '96, Information Processing Society of Japan, Dec. 2, 1996, vol. 96, No. 10, pp. 35-42.
Takeda, H., "The Present and the Future for Artifical Intelligence", Instrument and Control, Japan, the Society of Instrument and Control Engineers, Jun. 10, 2003, vol. 42, No. 6, pp. 508-511.
Tudhope, D. et al., "Augmenting Thesaurus Relationships: Possibilities for Retrieval", Journal of Digital Information, 2001, vol. 1, Issue 8, Article No. 41, pp. 1-20.
Turnbull, D. "Design and Development of a Semantic Music Discovery Engine", Dissertation Abstract, Publication No. 3320121, University of California, San Diego, Nov. 2008. Available at http://gradworks.umi.com/33/20/3320121.html.
van Rijsbergen, C.J., "Information Retrieval", 2nd Edition, 1979, http://citeseer.ist.psu.edu.
Wang, X. et al., "Chinese Weblog Pages Classification Based on Folksonomy and Support Vector Machine" Autonomous Intelligent Systems: Multi-Agents and Data Mining (Jun. 3-5, 2007), pp. 309-321.
Yang, H. et al., "Bridging the WWW to the Semantic Web by Automatic Semantic Tagging of Web Pages", Fifth International Conference on Computer and Information Technology, Sep. 21, 2005-Sep. 23, 2005, pp. 238-242.
Office Action in U.S. Appl. No. 11/343,084, mailed Mar. 25, 2009.
Office Action in U.S. Appl. No. 11/343,084, mailed Sep. 30, 2009.
Office Action in U.S. Appl. No. 11/343,084, mailed Apr. 9, 2010.
Office Action in U.S. Appl. No. 11/343,084, mailed Nov. 22, 2010.
Office Action in U.S. Appl. No. 11/401,448, mailed Mar. 4, 2008.
Office Action in U.S. Appl. No. 11/401,448, mailed Nov. 6, 2008.
Office Action in U.S. Appl. No. 11/401,448, mailed Jun. 30, 2009.
Office Action in U.S. Appl. No. 11/401,448, mailed Mar. 5, 2010.
Office Action in U.S. Appl. No. 11/401,448, mailed Dec. 28, 2010.
Office Action in U.S. Appl. No. 11/401,448, mailed Sep. 13, 2011.
Office Action in U.S. Appl. No. 11/401,448, mailed Apr. 10, 2013.
Office Action in U.S. Appl. No. 11/401,448, mailed Dec. 9, 2013.
Office Action in U.S. Appl. No. 11/648,901, mailed Dec. 31, 2008.
Office Action in U.S. Appl. No. 11/648,901, mailed Oct. 27, 2009.
Office Action in U.S. Appl. No. 11/648,901, mailed Dec. 21, 2010.
Advisory Action in U.S. Appl. No. 11/648,901, mailed Feb. 2, 2010.
Office Action in U.S. Appl. No. 11/648,901, mailed Sep. 21, 2011.
Office Action in U.S. Appl. No. 11/648,901, mailed Mar. 26, 2012.
Office Action in U.S. Appl. No. 11/648,901, mailed Oct. 15, 2012.
Office Action in U.S. Appl. No. 11/648,901, mailed May 23, 2013.
Notice of Allowance in U.S. Appl. No. 11/648,901, mailed Nov. 27, 2013.
Notice of Allowance in U.S. Appl. No. 11/648,901, mailed Feb. 4, 2014.
Office Action in U.S. Appl. No. 14/192,177 dated Sep. 23, 2014.

(56) References Cited

OTHER PUBLICATIONS

Turnbull, D. et al., "Five Approaches to Collecting Tags for Music", Proceedings of the 9th International Conference on Music Information Retrieval, 2008, pp. 225-230.
U.S. Appl. No. 14/243,812, filed Apr. 2, 2014.
Office Action in U.S. Appl. No. 11/730,930, mailed Jun. 19, 2008.
Office Action in U.S. Appl. No. 11/730,930, mailed Apr. 15, 2009.
Advisory Action in U.S. Appl. No. 11/730,930, mailed Jun. 26, 2009.
Office Action in U.S. Appl. No. 11/730,930, mailed Aug. 5, 2009.
Office Action in U.S. Appl. No. 11/730,930, mailed Mar. 11, 2010.
Notice of Allowance in U.S. Appl. No. 11/730,930, mailed May 13, 2014.
Office Action in U.S. Appl. No. 11/343,083, mailed Feb. 21, 2008.
Office Action in U.S. Appl. No. 11/343,083, mailed Nov. 10, 2008.
Office Action in U.S. Appl. No. 11/343,083, mailed Mar. 23, 2009.
Office Action in U.S. Appl. No. 11/343,083, mailed Sep. 25, 2009.
Office Action in U.S. Appl. No. 11/343,083, mailed Jun. 4, 2010.
Office Action in U.S. Appl. No. 11/343,083, mailed Feb. 8, 2011.
Office Action in U.S. Appl. No. 12/025,200, mailed May 11, 2010.
Office Action in U.S. Appl. No. 12/025,200, mailed Jan. 19, 2011.
Office Action in U.S. Appl. No. 12/025,200, mailed Oct. 17, 2011.
Office Action in U.S. Appl. No. 12/025,200, mailed Sep. 12, 2012.
Office Action in U.S. Appl. No. 12/025,200, mailed Oct. 31, 2013.
Notice of Allowance in U.S. Appl. No. 12/025,200, mailed Jan. 2, 2014.
Office Action in U.S. Appl. No. 12/263,943, mailed Dec. 20, 2013.
Office Action in U.S. Appl. No. 12/263,943, mailed Aug. 15, 2012.
Office Action in U.S. Appl. No. 12/263,943, mailed Jun. 7, 2011.
Office Action in U.S. Appl. No. 12/607,767 mailed Jun. 9, 2011.
International Preliminary Report on Patentability for PCT/US2006/003312, mailed on Oct. 25, 2007.
International Search Report for PCT/US2006/003312, dated Sep. 24, 2007.
International Preliminary Report on Patentability for PCT/US2006/013369, mailed on Apr. 9, 2009.
International Search Report for PCT/US2006/013369, dated May 21, 2008.
International Preliminary Report on Patentability for PCT/US2007/00025, mailed on Jul. 17, 2008.
International Search Report for PCT/US2007/00025, dated Feb. 13, 2008.
International Preliminary Report on Patentability for PCT/US2007/08428, mailed on Oct. 16, 2008.
International Search Report for PCT/US2007/08428, dated Jul. 8, 2008.
Japanese Office Action in Application No. 2007-553342, dated Jul. 4, 2011.
Japanese Final Office Action in Application No. 2007-553342, dated Mar. 26, 2012.
Japanese Final Office Action in Application No. 2007-553342, dated Sep. 3, 2012.
U.S. Appl. No. 14/192,177, filed Feb. 27, 2014.
International Search Report for PCT/US200603313, dated Oct. 2, 2007.
International Preliminary Report on Patentability for PCT/US200603313, mailed on Oct. 23, 2007.
Japanese Refusal in Application No. 2007-553343, dated Jan. 5, 2012.
Japanese Final Refusal in Application No. 2007-553343, dated Aug. 20, 2012.
International Search Report for PCT/US200852893, dated Jul. 23, 2008.
International Preliminary Report on Patentability for PCT/US200852893, mailed on Aug. 4, 2009.
International Search Report for PCT/US2008/082250, dated Dec. 30, 2008.
International Preliminary Report on Patentability for PCT/US2008/082250, mailed on May 4, 2010.
U.S. Appl. No. 12/607,767 mailed on Oct. 28, 2009.
Office Action in U.S. Appl. No. 14/192,177 dated Jun. 13, 2014.
Office Action in U.S. Appl. No. 12/263,943, dated Jul. 21, 2014.
Response to Office Action in U.S. Appl. No. 14/192,177 dated Sep. 12, 2014.
Response to Election/Restriction Requirement in U.S. Appl. No. 11/343,084, filed Jun. 3, 2009.
Amendment and Response to Office Action in U.S. Appl. No. 11/343,084, filed Dec. 29, 2009.
Amendment and Response with RCE to Office Action U.S. Appl. No. 11/343,084, filed Oct. 12, 2010.
Appeal Brief Submission in U.S. Appl. No. 11/343,084, filed Aug. 23, 2011.
Examiner's Answer to Appeal Brief Submission in U.S. Appl. No. 11/343,084, filed Nov. 18, 2011.
Patent Board Decision in U.S. Appl. No. 11/343,084, filed Sep. 11, 2014.
Amendment and Response with RCE to Office Action in U.S. Appl. No. 11/343,084, filed Nov. 12, 2014.
Amendment and Response to Office Action in U.S. Appl. No. 11/648,901, filed Jun. 29, 2009.
Response and Amendment After Final Office Action in U.S. Appl. No. 11/648,901, filed Jan. 22, 2010.
Amendment and Response with RCE to Office Action in U.S. Appl. No. 11/648,901, filed Nov. 29, 2010.
Amendment and Response with RCE to Office Action in U.S. Appl. No. 11/648,901, filed Aug. 22, 2011.
Amendment and Response to Office Action in U.S. Appl. No. 11/648,901, filed Mar. 21, 2012.
Amendment and Response with RCE to Office Action in U.S. Appl. No. 11/648,901, filed Sep. 25, 2012.
Amendment and Response to Office Action in U.S. Appl. No. 11/648,901, filed Apr. 15, 2013.
Amendment and Response with RCE to Office Action in U.S. Appl. No. 11/648,901, filed Oct. 23, 2013.
Examiner Initiated Interview Summary in U.S. Appl. No. 11/648,901, filed Nov. 27, 2013.
Examiner Initiated Interview Summary in U.S. Appl. No. 11/648,901, filed Feb. 4, 2014.
Amendment and Response to Office Action in U.S. Appl. No. 11/730,930, filed Dec. 18, 2008.
Response and Amendment After Final Office Action in U.S. Appl. No. 11/730,930, filed Jun. 12, 2009.
Amendment and Response with RCE to Office Action in U.S. Appl. No. 11/730,930, filed Jul. 15, 2009.
Amendment and Response to Office Action in U.S. Appl. No. 11/730,930, filed Jan. 5, 2010.
Pre-Brief Conference Request in U.S. Appl. No. 11/730,930, filed Sep. 13, 2010.
Pre-Brief Appeal Conference Decision in U.S. Appl. No. 11/730,930, filed Oct. 21, 2010.
Appeal Brief in U.S. Appl. No. 11/730,930, filed Nov. 22, 2010.
Examiner's Answer to the Appeal Brief in U.S. Appl. No. 11/730,930, filed Jan. 13, 2011.
Reply Brief in U.S. Appl. No. 11/730,930, filed Mar. 14, 2011.
Reply Brief Noted—Patent Board in U.S. Appl. No. 11/730,930, filed May 18, 2011.
Patent Board Decision—Examiner Reversed in U.S. Appl. No. 11/730,930, filed Feb. 27, 2014.
Applicant Initiated Interview Summary in U.S. Appl. No. 14/192,177 dated Aug. 15, 2014.
U.S. Appl. No. 14/512,062, filed Oct. 10, 2014.
Amendment and Response to Office Action in U.S. Appl. No. 11/343,083, dated Aug. 20, 2008.
Amendment After Final (After Notice of Appeal) in Office Action in U.S. Appl. No. 11/343,083, dated Mar. 9, 2009.
Appeal Brief in U.S. Appl. No. 11/343,083, filed May 11, 2009.
Response to Notice of Non-Compliant Appeal Brief in U.S. Appl. No. 11/343,083, filed Jul. 9, 2009.
Amendment and Response with RCE in Office Action in U.S. Appl. No. 11/343,083, dated Dec. 23, 2009.
Amendment and Response to Office Action in U.S. Appl. No. 11/343,083, dated Dec. 6, 2010.
Appeal Brief in U.S. Appl. No. 11/343,083, filed Mar. 8, 2012.

(56) References Cited

OTHER PUBLICATIONS

Examiner's Answer to Appeal Brief in U.S. Appl. No. 11/343,083, filed Apr. 26, 2012.
Amendment and Response to Office Action in U.S. Appl. No. 12/025,200, filed Nov. 11, 2010.
Amendment and Response to Office Action in U.S. Appl. No. 12/025,200, filed Jul. 19, 2011.
Amendment and Response with RCE in Office Action in U.S. Appl. No. 12/025,200, filed Apr. 17, 2012.
Amendment After Notice of Appeal in U.S. Appl. No. 12/025,200, filed Oct. 11, 2013.
Appeal Brief in U.S. Appl. No. 12/025,200, filed Oct. 15, 2013.
Notice—Defective Appeal Brief in U.S. Appl. No. 12/025,200, filed Oct. 16, 2013.
Response to Notice of Non-Complaint Appeal Brief in U.S. Appl. No. 12/025,200, filed Oct. 30, 2013.
Applicant Initiated Interview Summary in U.S. Appl. No. 12/025,200, filed Nov. 1, 2013.
Applicant Summary of Interview with Examiner in U.S. Appl. No. 12/025,200, filed Dec. 2, 2013.
Amendment and Response with RCE to Advisory Action in U.S. Appl. No. 12/025,200, filed Dec. 19, 2013.
Response to Notice to File Corrected Application Papers/Preliminary Amendment in U.S. Appl. No. 14/243,812, filed Jun. 25, 2014.
Applicant Response to Pre-Exam Formalities Notice and Preliminary Amendment in U.S. Appl. No. 14/243,812, filed Aug. 18, 2014.
Amendment and Response to Office Action in U.S. Appl. No. 12/263,943, filed Feb. 16, 2012.
Amendment and Response with RCE in Office Action in U.S. Appl. No. 12/263,943, filed Feb. 15, 2013.
Amendment and Response to Office Action in U.S. Appl. No. 12/263,943, filed Mar. 20, 2014.
Beaulieu et al., "Concept-based Interactive Query Expansion Support Tool (CIQUEST)", Dept. of Information Studies, Univ. of Sheffield, Jun. 2003, 102 pages.
Dave et al., "Mining the Peanut Gallery: Opinion Extraction and Semantic Classification of Product Reviews", WWW 2003, Budapest, Hungary, May 20-24, 2003, pp. 519-528.
Deerwester et al., "Indexing by Latent Semantic Analysis", J. of the American Society for Information Science, vol. 41, No. 6, © 1990, pp. 391-407.
Ermolayev et al., "Capturing Semantics from Search Phrases: Incremental User Personification and Ontology-Driven Query Transformation", Proc. of the 2nd International Conf. on Information Systems Technology and its Applications (ISTA 2003), © 2003, pp. 9-20.
Gong et al., "Generic Text Summarization Using Relevance Measure and Latent Semantic Analysis", SIGIR '01, New Orleans, LA, Sep. 9-11, 2001, pp. 19-25.
Guha et al., "Semantic Search", WWW 2003, Budapest, Hungary, May 20-24, 2003, pp. 700-709.
Gutwin et al., "Improving browsing in digital libraries with keyphrase indexes", Decision Support Systems, vol. 27, Issues 1-2, Nov. 1999, pp. 81-104.
Hu et al., "Mining and Summarizing Customer Reviews", KDD '04, Seattle, WA, Aug. 22-25, 2004, pp. 168-177.
Kawahara et al., "Key-Phrase Detection and Verification for Flexible Speech Understanding", ICSLP 1996, Philadelphia, PA, Oct. 3-6, 1996, pp. 861-864.
Koster et al., "Normalization and Matching in the DORO System", 21st BCS-IRRSG Annual Colloquium on IR Research, Glasgow, Scotland, © 1999, pp. 1-13.
Mani et al., "Multi-document Summarization by Graph Search and Matching", document No. arXiv:cmp-Ig9712004v1, American Association for Artificial Intelligence, Dec. 10, 1997, 7 pages.
Mihalcea et al., "PageRank on Semantic Networks, with Application to Word Sense Disambiguation", COLING '04, Association for Computational Linguistics, Aug. 2004, Article 1126, 7 pages.
Office Action in U.S. Appl. No. 11/343,084, mailed Jan. 28, 2015.
Amendment in U.S. Appl. No. 11/343,084, mailed Jul. 28, 2015.
Office Action in U.S. Appl. No. 11/343,084, mailed Sep. 21, 2015.
Office Action in U.S. Appl. No. 14/192,177 dated Apr. 6, 2015.
Amendment in U.S. Appl. No. 14/192,177 dated Oct. 6, 2015.
Notice of Allowance in U.S. Appl. No. 14/192,177, dated Oct. 23, 2015.
Office Action in U.S. Appl. No. 14/243,812 dated Feb. 25, 2015.
Amendment in U.S. Appl. No. 14/243,812 dated Aug. 24, 2015.
Office Action in U.S. Appl. No. 14/243,812 dated Nov. 10, 2015.

* cited by examiner

SYSTEM AND METHOD FOR SEARCHING FOR A QUERY

This application claims priority to U.S. Provisional Application No. 60/669,922, filed Apr. 11, 2005, and 60/686,929, filed Jun. 3, 2005, the contents of which are incorporated herein by reference.

BACKGROUND OF THE INVENTION

1. Field of the Invention

The present invention is directed to a system and method for searching and retrieving electronic documents in response to a query.

2. Description of Related Art

Electronic searching across large document corpora is one of the most broadly utilized applications on the Internet, and in the software industry in general. Regardless of whether the sources to be searched are a proprietary or open-standard database, a document index, or a hypertext collection, and regardless of whether the search platform is the Internet, an intranet, an extranet, a client-server environment, or a single computer, searching for a few matching texts out of countless candidate texts, is a frequent need and an ongoing challenge for almost any application.

One fundamental search technique is the keyword-index search that revolves around an index of keywords from eligible target items. In this method, a user's inputted query is parsed into individual words (optionally being stripped of some inflected endings), whereupon the words are looked up in the index, which in turn, points to documents or items indexed by those words. Thus, the potentially intended search targets are retrieved. This sort of search service, in one form or another, is accessed countless times each day by many millions of computer and Internet users. It is, for example, built into database kits offered by companies such as Oracle® and IBM®, which are utilized by many of the Fortune® 1000 companies for internal data management; it is built into the standard help file utility on the Windows® operating system, which is used on most personal computers today; and it is the basis of the Internet search services provided by Lycos®, Yahoo®, and Google®, used by tens of millions of Internet users daily.

Two main problems of keyword searches are (1) missing relevant documents (i.e. low recall), and (2) retrieving irrelevant ones (i.e. lack of precision). Most keyword searches do plenty of both. In particular, with respect to the first problem, the primary limitation of keyword searches is that, when viewed semantically, keyword searches can skip about 80% of the eligible documents because, in many instances, at least 80% of the relevant information will be indexed in entirely different words than words entered in the original query. Granted, for simple searches with very popular words, and where relevant information is plentiful, this is not much of a problem. But for longer queries, and searches where the relevant phrasing is hard to predict, results can be disappointing.

Some of the questions that arise in this context are:

How can a search engine recognize where there are equivalent words for the query words, e.g. that "mother-daughter matching sleeping gowns" matches "adult-child coordinated night gown set"?

How can a search engine recognize that "hotel room with a view of the Golden Gate Bridge" matches "suite that provides a panorama of the entire Bay Area skyline" where the phrase "Bay Area skyline", while not synonymous with "Golden Gate Bridge," is nonetheless very strongly related to it?

The second main problem in keyword search is that, not only do keyword searches overlook relevant matching texts, they also erroneously match irrelevant texts, due largely to the fact that words can be used in different senses.

Examples of questions that arise in this context are:

How can a search engine recognize that "bank an aircraft in high wind" is NOT a match for "His investment bank funded an aircraft company whose high sales brought in a windfall profit," despite that it has a high correspondence to the series of words in the query?

How can a search engine recognize that "Apple Slashes Price of Newest Macintosh" should match documents concerning personal computers and not the agriculture industry?

The common attempts at this problem revolve around various kinds of popularity ranking, e.g. with Google® the most-linked-to content across the Web, and/or with other search engines, the content that is most searched-for or most clicked-on-in-search-results-pages. However, the popularity is inferred, and there are a number of cases where popularity does not represent the intention of a particular user. Thus, this method, while it is guaranteed to work in a significant number of cases (the most popular ones), is guaranteed also not to work in all the other cases other than the most popular case.

Attempts have been made to address the above described missed relevant documents problem, or the low recall problem. Probably the most straightforward approach is to automatically add terms that are considered to be synonyms to the original query terms to the query. This is easily done by simple look-ups in a machine readable thesaurus or "WordNet." Most common synonyms are added automatically, and search is conducted for the query words as well as the synonym terms added. Unfortunately, this approach encounters some very significant problems in that:

1. Words have many different senses;
2. Words have many synonyms in each sense;
3. Most synonyms themselves have other senses which are NOT equivalent to the original word.

In fact, a study discussed in G. Grefenstette: *Explorations in Automatic Thesaurus Discovery*, pg. 112, Boston (1994), found that thesaurus based automatic query expansion, without making any semantic discrimination such as word sense disambiguation, varied the accuracy of the search from negative 17.7% to positive 10.4%. Thus, such simple expansion of search query terms sometimes made the accuracy of the search results worse, and never made accuracy better than approximately 10%.

This is understandable because, for example, the word "bank" can mean a financial institution, the edge of a river, the turning of an aircraft, the willingness to believe something ("you can bank on it!"), etc. Taking the second of these senses, the word "turn," though it can be a valid synonym of "bank," will also have other senses (such as in "it's your turn" or "the turn of the century", etc.) which have nothing to do with any of the senses of "bank." This means that automatically adding all the terms that are considered to be synonyms of every query term usually creates more irrelevant hits, not fewer. While the synonyms do give the benefit of enabling the search engine to find more relevant information, that effect is overshadowed by the creation of a mountain of additional, irrelevant search results. Thus, adding the synonyms turns out to make matters worse, not better.

The irrelevant result, or lack of precision problem is practically the opposite, or the "converse" in that instead of missing a document that is relevant, the search engine includes results that are not actually relevant. This usually happens because, again, words can be used in variant senses, meaning that a document can satisfy the query perfectly when viewed from the perspective of a keyword-match rate, but the words in the target document may have been used in different senses from those in the query so that the document is irrelevant. Although this seems to be an "opposite" problem, it really derives from the same fundamental problem which is the inability of keyword search engines to be cognizant of word senses.

Thus, the two recall and precision problems of searches (missed candidates and irrelevant results) share some important things in common in that both problems are rooted in the failure to distinguish word senses, and both have had their attempted solutions suffer from creating, in at least some respects, a worse picture, rather than a better one for the user. Thus, there exists an unfulfilled need for a system that can address the problem of word sense disambiguation.

In order to appreciate how widespread, and how consternating the problem of polysemy (multiple meaning) of words can be, consider the word senses for the word "Space" which include: Outer space (noun); Real estate "vacant space" (noun); Blank space on a paper such as for signature (noun); Blank space between letters in a sentence (noun); "space the fence posts farther apart, please" (verb); "space my appointments farther apart, please" (temporal application); to go into a trance "he spaced out" (not in most lexicons); Industry niche "competitors in our space" (not in most lexicons). Other examples of common, highly polysemous words are: bank, break, call, dark, date, interest, love, mean, plane, play, stage, time, try, view, window, and thousands of other words.

Conventional methods of word sense disambiguation proposed in the art generally proceed along the following lines:
1. Manually sense-tag corpus of texts (mark each word as to its canonical sense). One will use most of this data as the "training data" while saving a minority portion for the "testing data."
2. Using the training data, for each sense of each word, extract contextual features (e.g. record which words are found frequently occurring next to, or in the same sentence as, or within n words distance of the target word).
3. Determine common patterns in the contextual features (e.g. apply any standard machine learning algorithm, whether that be neural nets, or case-based reasoning, or genetic classifiers, or other) to enable classification among several senses of a word, and validate the classifier on the testing data.

After the foregoing project is completed, then based on the determined patterns (or feature value-sets, or derived rules concerning them) of the classifier, new occurrences of words (given a surrounding context, i.e. the text before and/or after the word) can be assigned a guess, or a probability, of having certain senses, i.e. be classified according to their canonical sense. A considerable amount of research and debate has surrounded steps 2 and 3 of this process, and it is no doubt fruitful to investigate and optimize these phases. However, the conventional methods of word sense disambiguation proposed agree on Step 1. A large set of manually tagged training data is presumed in the vast majority of methods attempted in word sense disambiguation.

Other related art include Ramakrishnan, G., Prithviraj, B., Deppa, A., Bhattacharya, P., and Chakrabarti, S.: *Soft Word Sense Disambiguation*, Proceedings of the Second International WordNet Conference—GWN 2004, 291-298, Masaryk University Brno, Brno, Czech Republic, December (2003). Ramakrishnan has proposed a soft word disambiguation which does not "pin down" a single word sense for every query term. Another related art includes Agirre, E. and Martinez, D.: Exploring *Automatic Word Sense Disambiguation With Decision Lists and the Web*, Proceedings of the COLING 2000 Workshop on Semantic Annotation and Intelligent Content, Saarbrcken, Germany (2000). Agirre and Martinez have proposed employing a Bayesian network in automating the disambiguation task. Still another related art is Hearst, M.: *Texttiling: Segmenting Text Into Multi-Paragraph Subtopic Passages*, Computational Linguistics 23(1): 33-64 (1997). Yet another related art includes Beaulieu, M.: *Experiments On Interfaces To Support Query Expansion*, Journal of Documentation 53.1 (1997), pg. 8-9.

SUMMARY OF THE INVENTION

The above described method and the required manually tagging of training data, by itself, presents the biggest limitation for search applications. In particular, the need to manually tag a corpus containing numerous example sentences for each word in a variety of contexts, presents not one, but several problems to the designer of an open-ended search application:
1. The manual labor cost, in number of hours, is mind-boggling. It can take a couple of graduate students an entire semester to manually tag the several thousand example sentences that are required as training data for disambiguating one single word in the English language as an example of their algorithm. For this effort to be extrapolated to the entire English language in common use (say, 200,000 words or more) is something difficult to imagine.
2. The labor in question is not just any sort of labor, but linguistically trained labor. The tagging must be performed by those who understand grammar, parts of speech and canonical word senses, and are very literate. This skill requirement extends far beyond that of the worker typically employed to do standard data processing. This fact further magnifies the prospective cost of manually tagging a corpus.
3. Many word senses simply do not have enough examples in the corpus to provide a sufficient baseline for subsequent disambiguation, even if the data were all tagged.
4. Some words have senses which have not yet entered the canonical sense listings.
5. Some words are new, and have not even been entered as headwords in standard lexicons.

In view of the above described formidable roadblocks to implementing scalable word sense disambiguation for generalized search applications, an alternative approach to providing improved search results is required.

Thus, there exists an unfulfilled need for a search system and method that minimizes the limitations and disadvantages of the prior art system and methods for searching and retrieving electronic documents. In particular, there exists an unfulfilled need for a search system and method that increases the number of relevant electronic documents retrieved that is otherwise missed by conventional search systems. In addition, there exists a need for such a search system and method that reduces the inclusion of irrelevant electronic documents in the results of a search. Moreover, there also exists an unfulfilled need for a search system and method that provides more relevant electronic documents in response to a query than possible by simple keyword searching.

In view of the foregoing, an advantage of the present invention is in providing a system and method that reduces the number of relevant electronic documents that are missed in performing a search, thereby enhancing recall.

Another advantage of the present invention is in providing a system and method that reduces the inclusion of irrelevant electronic documents in results of a search, thereby improving precision.

Still another advantage of the present invention is in providing an economical system and method that provides more relevant electronic documents in response to a query than possible by simple keyword searching.

In accordance with one aspect of the present invention, a search system for searching for electronic documents, and providing a search result in response to a search query is provided. In one example embodiment, the search system includes a processor, a user interface module adapted to receive a search query from a user, the search query having at least one search query term, and a query processing module that analyzes the search query term to identify candidate synonym words. The query processing module also determines which of the candidate synonym words are equivalent terms to the search query term, and in a same sense as the at least one search query term as used in the search query. In addition, the search system includes a search engine that executes a search based on the search query term and the equivalent terms.

In accordance with one embodiment, the search system also includes a prior probability module that calculates and assigns prior probability scores to the candidate synonym words, the prior probability scores reflecting a likelihood of each candidate synonym word being used in an equivalent manner to the search query term. In this regard, the query processing module determines which of the candidate synonym words are equivalent terms to the search query term based at least partially on the prior probability scores. In one embodiment, the prior probability module calculates and assigns prior probability scores for the candidate synonym words based at least partially on distribution of senses of the at least one search query term, and/or part-of-speech bias.

In accordance with another embodiment, the query processing module substitutes one of the candidate synonym words into the search query in place of the query search term to generate a modified search query, and the search engine executes a search using the modified search query. In this regard, the query processing module substitutes each of the candidate synonym words, and the search engine executes searches using the modified search queries. The query processing module determines which of the candidate synonym words are equivalent terms to the search query term based at least partially on which of the candidate synonym words yield multiple matches in semantically continuous segments retrieved by the search engine and attested by at least two electronic documents.

In accordance with another embodiment of the present invention, the search system further includes a query pre-processing module with at least one word set list that lists co-occurring query words in popular queries, wherein the pre-processing module determines equivalent terms to the co-occurring query words. The query pre-processing module retrieves the determined equivalent terms in response to co-occurring query words being submitted as a search query. In addition, the query pre-processing module is preferably implemented to retrieve an intersection of the determined equivalent terms if a plurality of co-occurring query words are submitted as a search query.

In accordance with still another embodiment of the present invention, the use interface module is adapted to display the candidate synonym words that are determined to be equivalent terms to the search query term. In this regard, the user interface module may be adapted to allow one or more of the equivalent terms to be suppressed from being used by the search engine. In another implementation, the use interface module is adapted to display a user selectable alternative sense for the search query term.

In yet another embodiment of the present invention, the search system may include a filtering module adapted to analyze the search query to determine whether the search query is directed to pornography, and block pornographic electronic documents if the search query is determined to be not directed to pornography.

Another aspect of the present invention is in providing a computer implemented method for searching electronic documents, and providing a search result in response to a search query. Still another aspect of the present invention is in providing computer readable medium with executable instructions for searching for electronic documents, and providing a search result in response to a search query.

These and other advantages and features of the present invention will become more apparent from the following detailed description of the preferred embodiments of the present invention when viewed in conjunction with the accompanying drawings.

DETAILED DESCRIPTION OF THE PREFERRED EMBODIMENT

As will be described in further detail herein below, the search system and method of the present invention reduces the inclusion of irrelevant electronic documents in the results of a search to thereby improve precision, while also providing more relevant electronic documents in response to a query to thereby improve recall, than otherwise attained by conventional search systems known in the art. In particular, the search system and method of the present invention distinguishes on an automated basis, those candidate synonym words that are considered to be actually equivalent to the terms of the original query which are most likely to actually be used in an equivalent manner in the same sense as the terms of the original query. As explained in further detail below, this is attained by utilizing the text corpus and the history of past queries. Thus, the prohibitively costly manual tagging of word senses required in the proposed word sense disambiguation systems and methods is not required the search system and method of the present invention.

Figure 1:
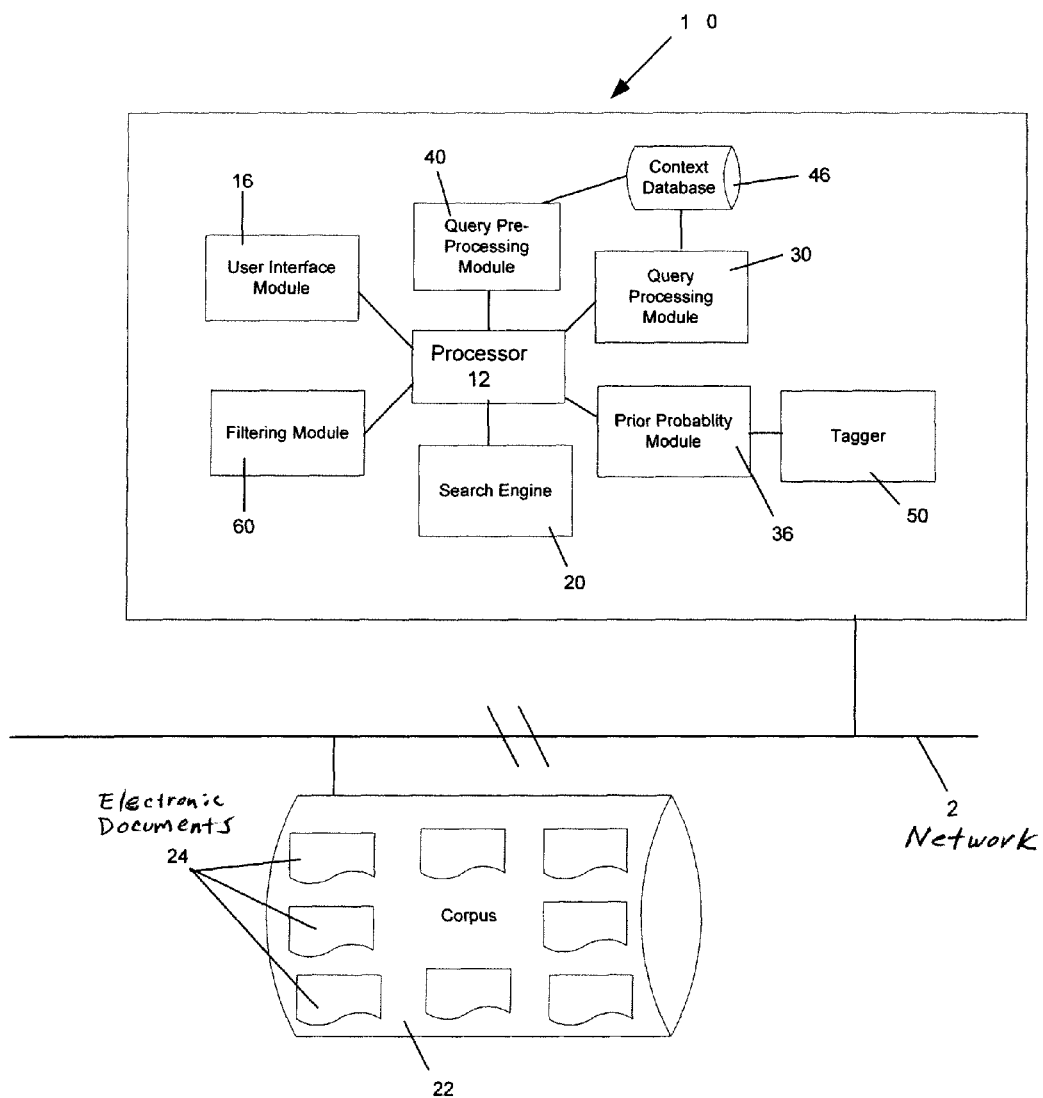
FIG. 1 shows a schematic view of a search system in accordance with one embodiment of the present invention.

FIG. 1 illustrates a schematic view of a search system 10 in accordance with one embodiment of the present invention that searches for electronic documents stored in a computer readable media in response to a query, and provides a search result. It should initially be understood that the search system 10 of FIG. 1 may be implemented with any type of hardware and/or software, and may be a pre-programmed general purpose computing device. For example, the search system 10 may be implemented using a server, a personal computer, a portable computer, a thin client, or any suitable device or devices. The search system 10 and/or components thereof may be a single device at a single location, or multiple devices at a single, or multiple, locations that are connected together using any appropriate communication protocols over any communication medium such as electric cable, fiber optic cable, or in a wireless manner.

It should also be noted that the search system 10 in accordance with the present invention is illustrated and discussed herein as having a plurality of modules which perform particular functions. It should be understood that these modules are merely schematically illustrated based on their function for clarity purposes only, and do not necessary represent specific hardware or software. In this regard, these modules may be hardware and/or software implemented to substantially perform the particular functions discussed. Moreover, the modules may be combined together within the search system 10, or divided into additional modules based on the particular function desired. Thus, the present invention, as schematically embodied in FIG. 1, should not be construed to limit the search system 10 of the present invention, but merely be understood to illustrate one example implementation thereof.

Referring again to the illustrated embodiment of FIG. 1, the search system 10 includes a processor 12 that is electronically connected to a user interface module 16, a search engine 20, and a query processing module 30, these modules being electronically interconnected by their connection to the processor 12 in the illustration of FIG. 1. The search system 10 also includes prior probability module 36, and a query pre-processing module 40 that are also electronically connected to the processor 12, and a context database 46 which is electronically connected to the query processing module 30 and the query pre-processing module 40. Furthermore, the search system 10 includes a filtering module 60 connected to the processor 12. The various functions of the various modules and components of the search system 10 is controlled by the processor 12 as described in further detail below. In addition, whereas a single search engine 20 is shown in FIG. 1, it should be also understood that the search engine 20 may be implemented as more than one search engine, and can be one or more of the search engines in common use.

In addition, the search system 10 is further electronically connected to a corpus 22 having a plurality of electronic documents 24 stored therein. It should be understood that as used herein, the term "electronic document" refers to any computer readable file, regardless of format and/or length. For instance, web pages of websites, word processing documents, presentation documents, spreadsheet documents, PDF documents, etc., are all examples of electronic documents referred to herein. It should also be evident that the corpus 22 illustrated is remotely located, and is in communication with the search system 10, via a network such as the Internet 2. Of course, in other embodiments, the corpus 22 may be provided within the search system 10 itself as a component thereof. In addition, the corpus 22 may be accessed by one or more search engines, which can be used to retrieve electronic documents, or segments thereof.

The user interface module 16 is adapted to receive a search query such as one or more search terms or a phrase from the user of the search system 10 indicative of the content of documents that are of interest to the user. The user interface module 16 provides the search query to the query processing module 30 which processes the search query in the manner described in detail below, and provides the processed search query to the search engine 20. The search engine 20 is adapted to search the corpus 22 to identify those documents from the plurality of electronic documents 24 that satisfy the search query that has been processed by the query processing module 30. Of course, searching of the corpus 22 by the search engine 20 may be attained in any appropriate manner, and can be facilitated by utilization of word indexes as already known in the art. Those electronic documents 24 that satisfy the search query are identified to the user as a search result.

In the above regard, in accordance with the present embodiment, the query processing module 30 analyzes the terms or phrases of the search query received by the user interface module 16, to determine candidate synonym words that are actually equivalent terms which can be utilized to accurately expand the search results generated by the search engine 20. In particular, as discussed in further detail below, the query processing module 30, and the various other modules connected thereto, function together to identify those equivalent terms that are most likely to increasing recall of the search results, while also preserving precision and relevancy of the documents retrieved through the search. In the embodiment disclosed below, this processing by the query processing module 30 and the other modules are performed before the actual search is performed by the search engine 20. However, in other embodiments, this processing may be performed after conventional search results are provided to the user by the search engine 20.

In the preferred embodiment of the present invention, the query processing module 30 identifies the candidate synonym words and processes these candidate synonym words based at least on a prior probability score as provided by the prior probability module 36, in order to identify those candidate synonym words that are actually equivalent to the search query term in the context of the search query, i.e. truly synonymous and in the same sense in which the search query term is used in the search query. Correspondingly, as used herein, candidate synonym words refer to those words that are considered to be synonyms to the query term by reference sources such as WordNet or electronic thesauri. In contrast, equivalent terms as used herein refer to those synonym words that have been analyzed to be actually equivalent and has the same sense as the search query term.

In this regard, the prior probability module 36 of the search system 10 calculates and assigns a prior probability score to every candidate synonym words, the prior probability score reflecting the likelihood of the synonym of a given search query term to be actually be used in an equivalent manner to the given search query term, i.e. in the same sense and meaning as a particular search query term. The candidate synonym words for any given search query term may be obtained from any appropriate source. For example, candidate synonym words may be obtained from WordNet, an electronic thesaurus, or other sources.

The determination of the prior probability score by the prior probability module 36 of the search system 10 preferably assigns the prior probability to every synonym reflecting its probability of being relevant based on (1) the distribution of senses listed of the at least one search query term, for example, in WordNet, and (2) the bias as to part-of-speech of the query terms submitted by users, i.e. whether the query terms are Noun, Verb, Adjective, Adverb, etc.

In the preferred example implementation, the calculation of the prior probability score for a word is attained by the prior probability module 36 by examining the word's sense numberings in all four parts-of-speech in WordNet, and giving each one a weighting inversely proportional to the longest sense-depth. Thus, for example, where the largest number of word senses in any part-of-speech is 6, the $6^{th}$ sense of the word was weighted a 1, and the $1^{st}$ sense of the word in every part-of-speech was weighted 6, even in those cases where a part-of-speech has less than 6 senses. The prior probability module 36 then scores each sense of each part-of-speech as a function of this sense weight, divided by the total of all sense weights across all part-of-speech.

The determination of the prior probability score for a word by the query processing module 30 is mathematically represented in formulas:

$$PPSBase(W, P, S) = \frac{\text{Max}_{Pi}(NumSenses(W, Pi) - S - 1)}{\sum_{Si}(\text{Max}_{Pi}(NumSenses(W, Pi)) - S_{Si} - 1)}$$

$$PPSBias(W, P, S) = PPSBase(W, P, S) \times \frac{NumSenses(W, P)}{\sum_{Pi} NumSenses(W, Pi)} \times$$

$$\begin{cases} 1 & \text{when } NumSenses(W, P) = \sum_{Pi} NumSenses(W, Pi) \\ Bias(P) & \text{when } NumSenses(W, P) < \sum_{pi} NumSenses(W, Pi) \end{cases}$$

$$PPSBiased(W, P, S) = \frac{PPSBias(W, P, S)}{\sum_{Pi,Si} PPSBias(W, Pi, Si,)}$$

$$SenseCntBonus(W, P, S) =$$

$$\frac{\begin{cases} 1 & \text{when } SenseCnt(W, P, S) = 0 \\ SenseCnt(W, P, S) * 2 & \text{when } SenseCnt(W, P, S) > 0 \end{cases}}{\sum_{Pi,Si}\begin{cases} 1 & \text{when } SenseCnt(W, Pi, Si) = 0 \\ SenseCnt(W, Pi, Si) * 2 & \text{when } SenseCnt(W, Pi, Si) > 0 \end{cases}}$$

$$PPS(W, P, S) = \frac{PPSBiased(W, P, S) + (1 - PPSBiased(W, P, S)) \times SenseCntBonus(W, P, S)}{PPSBiased(W, Pi, Si) + (1 - PPSBiased(W, Pi, Si)) \times SenseCntBonus(W, Pi, Si)}$$

$$PP(W1, W2) =$$

$$\sum_{Pi,Si}\begin{cases} 0 & \text{when } W2 \text{ not found in } Pi, Si \text{ of } W1 \\ PPS(W1, Pi, Si) \times & \text{when } W2 \text{ found as equivalent} \\ EquivTypePenalty(Ei) & \text{of type } Ei \text{ in } Pi, Si \text{ of } W1 \end{cases}$$

where:

PP(W1,W2) is the Prior Probability Score of W1 being an equivalent term given W2;

W: Word;

P: Part-of-speech;

S: Sense number (1 based);

EquivTypePenalty( ) is a constant penalty based on the equivalence type (i.e. synonym, hyponym, hypernym, etc.); and Presuming that Sense numbering starts at 1.

The prior probability module 36 in the preferred embodiment is implemented to further modify the prior probability score as determined above to take into consideration both internal and external part-of-speech bias. The "internal part-of-speech bias" is derived, for example, from WordNet, by counting to determine which part-of-speech has the most senses listed for the given word, and calculating a proportional bias accordingly. The "external part-of-speech bias" is derived from a usage profile of the search engine 20. In particular, the usage profile of search engines shows that users most frequently search for nouns, and least frequently for adverbs, with the frequency of search for verbs and adjectives falling in between nouns and adverbs. Moreover, in search engine queries, it is far more common for nouns and noun modifiers to be entered as search queries, than verbs or adverbs. Thus, based on a statistical examination of queries in this regard, a simple bias can be added such that, all other things being equal, certain parts-of-speech will be favored over other parts-of-speech.

The above adjusted prior probability score as determined in the manner described is then stored by the prior probability module 36 in the context database 46 for retrieval and use by the query processing module 30 in the manner described below.

As previously noted, the query processing module 30 identifies which of the candidate synonym words are considered by reference sources to be the same as the terms of the original search query (as provided by reference sources such as WordNet, thesaurus, etc.) are, in fact, accurate synonymous equivalent terms for the query terms in the sense, or context in which they are submitted. In this regard, in the preferred embodiment, the query processing module 30 substitutes the various candidate synonym words, one at a time, in to the context of the remaining, unaltered query terms, and submits this modified search query to the search engine 20 in what can be considered to be a preliminary synonymy verification search step, to determine which of the candidate synonym words, yields multiple matches in semantically continuous segments retrieved by the search engine 20. Thus, the query processing module 30 checks the semantic distance between the query terms in contiguous text blocks, such as a paragraph of text, and identifies when there is a marked shift in semantic space.

If the candidate synonym word that has been substituted into the other terms of the query is found together with the original query terms within the text corpus, but not within a semantically continuous block of text, the candidate synonym word is disqualified from being used to expand the scope of the original search query terms. Thus, a substantial number of terms which would be considered to be synonyms by conventional search engines and would be used to expand the search query in prior art search systems, are disqualified by the query processing module 30 of the search system 10 in accordance with the present invention.

Furthermore, in the preferred embodiment, the query processing module 30 further requires those candidate synonym words that satisfy the above described semantically continuous block of text requirement, to further satisfy a multiple attestation requirement. More specifically, the query processing module 30 of the preferred embodiment requires satisfaction of the semantically continuous block of text requirement in two or more electronic documents 24 of the corpus 22.

The present inventors have found through experimentation and prototyping that that finding one attestation of the required match is not a good enough indicator of the candidate synonym word's appropriateness for use in expanding the scope of the query terms. In the regard, experimentation and prototyping showed that requiring two attestations greatly improved precision of the results obtained by the search engine 20. It should also be noted that applying even more rigorous attestation requirement, for example, requiring three or four attestations, have been found to not substantially increase the eventual precision beyond what was gained with the above described double-attestation threshold.

For those candidate synonym words that satisfy the multiple attestation requirement, the query processing module 30 then determines a final confidence score indicating the degree to which the candidate synonym word is contextually equivalent to the substituted term of the original query. This final confidence score is determined based on the above parameters, i.e. the prior probability score as determined by the prior probability module 36 and retrievable stored in the context database 46, and whether the candidate synonym words yields multiple matches in a semantically continuous segments retrieved by the search engine 20 in response to the search query with the substituted candidate synonym word.

In order for a candidate synonym word to be considered to be likely equivalent to the original search term, the query processing module 30 requires that each candidate synonym word must have at least a predetermined threshold final confidence score. Only those candidate synonym words that meet these conditions are deemed to "pass" with regard to the context represented by the other terms in the original query, and can be considered to be synonyms to the original terms of the original search query. Thus, the query processing module 30 determines a meaningful subset of equivalent query terms that are far more likely to preserve precision when used together in a disjunctively expanded query, than would otherwise be the case if the entire, unaltered set of potentially equivalent terms are used, such as performed in the prior art search systems.

Thus, the method described above as implemented by the query processing module 30 and the prior probability module 36 of the search system 10 is substantially different from the previously noted soft word sense disambiguation proposed by Ramakrishnan in the manner in which the probabilities of each word sense are calculated, and also in its granularity, as the prior probability scores are determined at the level of every synonym within each sense of the word, and not at the level of WordNet senses. In addition, the method described above as implemented by the query processing module 30 of the search system 10 is substantially different from the previously noted approach of Agirre and Martinez in that the query processing module 30 analyzes the context of co-occurring query words and their candidate synonym words, using a context validation model that combines statistical and rule-based approaches as described, instead of a Bayesian network.

An example of the operation and function of the search system 10 is illustrated in Table 1, where the query "hotel with activities for kids" was submitted in several different forms to a search engine 20 to perform keyword searches. In particular, Table 1 sets forth four columns: "Unexpanded", "Unprocessed", "After Processing", and "After Proper-Name Pruning". The "Synsets" row provides the set of resulting synonyms which are submitted to the search engine 20. The "Precision" row provides the preciseness of the search results obtained by submission of the synsets to the search engine 20, i.e. whether the resulting electronic documents retrieved by the search engine 20 in response to the searched synsets are, in fact, relevant.

In particular, referring to the columns of Table 1, "Unexpanded" refers to the original, unexpanded query terms. "Unprocessed" refers to the original query terms, and all of the candidate synonym words that are commonly considered to be synonyms to the original terms, which may be provided by WordNet, for instance. "After Processing" refers to the remaining equivalent terms after the query processing module 30 and the prior probability module 36 of the search system 10 process the candidate synonym words set forth in the Unprocessed column. Thus, all of the terms set forth in Synsets of the After Processing column satisfy the final confidence score requirement described above. Finally, "After Proper-Name Pruning" refers to the equivalent terms set forth in Synsets of the After Processing column but with proper names removed. All of the synsets identified in the various columns were submitted to the search engine 20 to obtain search result corresponding thereto, and the relevancy of the retrieved documents were determined, the results of which is set forth in the "Precision" row.

As can be seen, there are very many synonyms (26 total) in the unaltered and unprocessed WordNet synset as set forth in the Unprocessed column of Table 1. In conventional search systems known in the prior art, such identified synonyms would be utilized together with the original search terms to perform a search. However, as previously described, this results in many irrelevant results being retrieved because most words have more than one word sense. Correspondingly, the words that are used to expand the search are not likely equivalents to the words of the original query, thereby severely degrading the precision of the search results obtained by the search system.

Referring again to Table 1, after the search system 10 processes these candidate synonym words in the manner described above, a much shorter list of four equivalent terms are identified as being equivalent to the original search query terms. These equivalent terms are likely to be used in the same sense as the sense in which original search query terms were used in the original search query. These terms can then be utilized together with the original search query terms, to expand the search and enhance recall, without reducing precision of the search.

In the particular example set forth in Table 1, the search system 10 of the presently described implementation discarded 85% of the synonyms that would have otherwise been used by conventional prior art search systems, and only retained 15% of the candidate synonym words as being equivalent terms for use in expanding the search. In forty sample queries that were tested, the average synonym retention rate by the query processing module 30 was approximately 28% (i.e. 72% of the candidate synonym words were discarded).

Furthermore, as noted, the unexpanded, unprocessed, processed, and proper name pruned query terms were submitted as a query to the search engine 20 to review the level of precision of the search results. In particular, the search results obtained by submitting the noted synsets were reviewed to determine the percent of the retrieved documents are, in fact, relevant to the original search query. Thus, to determine the search precision set forth in the "Precision" row, the resultant retrieved electronic documents comprising the top twenty results for each of forty sample queries, at four different phases: unexpanded, expanded (but unprocessed), processed with context analysis, and processed with both context and proper-name analysis, were manually analyzed and graded.

Thus, in the particular example query addressed in Table 1, when the original, unexpanded query terms were submitted to the search engine 20, 0.95 precision score was obtained. This means that 95% of the top twenty documents retrieved and provided as a result were relevant. When the synset of expanded, but unprocessed, query terms were submitted to the search engine 20, the precision went down drastically to only 0.6, which means that only 60% of the top twenty documents retrieved were relevant. This synset of expanded query terms were then processed by the query processing module 30 and the prior probability module 36 of the present invention, thereby eliminating many of the candidate synonym words. The equivalent terms remaining after the processing were submitted to the search engine 20. The search precision score obtained was 0.9 which means that 90% of the top twenty documents retrieved were relevant, which is only 5% less than that of the original, unexpanded search.

TABLE 1

Example of contextual synset analysis of "hotel with activities for kids"

| | Unexpanded | Unprocessed [full list from WordNet 2.0] | After Processing With Context Analysis [hotel, activities, kids] | After Proper-Name Pruning |
|---|---|---|---|---|
| Synsets | N.A. | [hotel] [activity, action, activeness, bodily process, body process, bodily function, natural process, natural action] [kid, banter, chaff, child, fry, jolly, josh, kidskin, Kyd, minor, nestling, nipper, pull leg, shaver, small fry, tiddler, tike, tyke, young goat, youngster] | [hotel] [activity] [kid, child, jolly, nestling, youngster] | [hotel] [activity] [kid, child, nestling, youngster] |
| Precision [top twenty hits] | .95 | .60 | .90 | .95 |

As can be seen in Table 1, and as also shown in Table 2 discussed below, context processing alone, does not quite restore the same level of precision of an unexpanded query. However, when proper-name pruning is added, substantially the same level of precision is attained, as shown in the After Proper Name Pruning column. This pruning can be considered to be a type of context analysis which brings in additional background knowledge, i.e. lists of established proper names. Correspondingly, upon submitting the processed equivalent terms after proper-name pruning to the search engine 20, a search precision score of 0.95 was obtained in the example query set forth in Table 1, which is the same level of precision as the original, unexpanded query.

The search precision scores of numerous other search queries are set forth in Table 2, the original query being set forth in the first column indicated as "Original Query". The precision scores for each respective query are set forth in the various columns, including "Unexpanded", "Unprocessed", "After Processing", and "After Proper-Name Pruning" columns, as in the manner set forth in Table 1. In addition, the average precision scores for the ten original search queries set that are set forth in the second to last row of Table 2.

As can be seen, in the second to the last row, the average precision score for the ten identified original queries were 79%. When mere candidate synonym words are used to expand the search query in the manner performed by prior art search systems, the average precision score was only 49%. When these candidate synonym words are further processed by the query processing module 30 and the prior probability module 36 of the search system 10 in accordance with the preferred embodiment of the present invention, the average precision score increased to 74%. After proper name pruning, the average precision score further increased to 82%.

The last row of Table 2 sets forth average precision scores for all 40 search queries which where analyzed in validating an example implementation of the search system 10 in accordance with the present invention. As can be seen in the last row, the average precision score for the 40 original queries were 76%. When mere candidate synonym words are used to expand the search query, the average precision score was only 41%. When these candidate synonym words are further processed by the query processing module 30 in accordance with the preferred embodiment of the present invention, the average precision score increased to 72%. After proper name pruning, the average precision score increased to 80%.

In the above regard, it should be noted that the results set forth in Table 2 were obtained by tuning the threshold of the final confidence score described above until recall improvements occurred with no loss of precision. Specifically, the final confidence score was normalized on a 0-1.0 scale, and the threshold final confidence score requirement was set at 0.68. Of course, the threshold final confidence score requirement may be further adjusted upwardly or downwardly, as a larger set of queries are analyzed to determine the performance characteristics of the search system 10. However, the threshold final confidence score of 0.68 has been found to be sufficient in the analysis of the 40 sample queries set forth.

Furthermore, it can also be seen that the precision score after proper name pruning (at the 0.68 threshold for the final confidence score), actually increased as compared to the precision score of the unexpanded, original query, although the goal was only to preserve the same level of precision. In particular, the precision score increased from 76% of the unexpanded original query, to 80% for after proper name pruning. However, the slight increase in precision is not likely to be statistically significant, given the relatively small sample size of 40 search queries. Nonetheless, it should now be apparent to one of ordinary skill in the art that the precision of search can be substantially maintained by the described implementation of the search system of the present invention.

TABLE 2

Summary of search precision scores of results (top twenty documents)

| Original Search Query | Unexpanded | Unprocessed | After Processing With Context | After Proper Name Pruning |
|---|---|---|---|---|
| "hotels with activities for kids" | 95% | 60% | 90% | 95% |
| "parking near Stratford Court hotel" | 75% | 40% | 70% | 80% |
| "winter hiking trails in the Bay area" | 95% | 55% | 85% | 90% |
| "guided tours of caves in France" | 80% | 65% | 75% | 95% |
| "nightgown with buttons all the way down" | 35% | 40% | 60% | 65% |
| "replacement parts for microwave oven" | 70% | 50% | 65% | 65% |
| "major earthquakes in Asia" | 80% | 30% | 70% | 75% |
| "conservative criticism on Bill of Rights" | 95% | 45% | 55% | 90% |
| "missile treaties with China" | 75% | 40% | 75% | 75% |
| "laws on growing marijuana in Oregon" | 85% | 65% | 90% | 90% |
| AVERAGE (of the above 10 queries) | 79% | 49% | 74% | 82% |
| AVERAGE (of all 40 sample queries) | 76% | 41% | 72% | 80% |

Of course, one of the primary goals of the search system 10 in accordance with the present invention is to enhance the number of relevant documents retrieved, i.e. to improve recall. Recall is difficult to judge when searching the entire WorldWideWeb. However, it should be evident that the query processing module 30 of the search system 10 can only improve recall because additional equivalent terms are provided to the search engine 20, together with the original query terms. Thus, all of the documents that would have been retrieved by the search engine 20 based on the original query terms will still be retrieved. In addition, those documents that satisfy the equivalent terms as further provided by the query processing module 30 will also be retrieved by the search engine 20, thereby increasing the number of retrieved documents.

Correspondingly, whereas the precision was measured as a strict percentage as described above, recall was monitored in relative or "pragmatic" terms, as the number of new, relevant electronic documents appearing in the top twenty documents retrieved as a result of the search by the search engine 20, that did not, and never could be, retrieved by mere submission of the unaltered original query terms by the virtue of the fact that these documents use words different from the original query terms.

For example, on the aforementioned query set forth in Table 1, after the expanded and processed equivalent terms were submitted to the search engine 20, the results included a web page for the Denali Bluffs Hotel within the top twenty electronic documents retrieved. This retrieved webpage describes "Tundra Wilderness Tour" recommended for families with "children". Importantly, this retrieved webpage does not mention the original query terms "kid". Moreover, another web page was retrieved explaining that the Grand Hyatt in Beijing has an affiliation with the Imperial Tours Company, offering a "family and child-oriented luxury tour of China." In total, four out of the top twenty electronic documents retrieved by the search engine 20 would not have satisfied the original query on a strict keyword-matching basis. When viewed against the nineteen relevant documents found originally in the top twenty, the "relative" increase in recall is 21% (i.e., 4/19).

Across the 40 sample queries analyzed with respect to Table 2, the average relative increase in recall was higher at approximately 38%. However, the relative increase varied dramatically from a low of 7% (1/14) to a high of 300% (9/3), and the standard deviation was rather large (0.18). This suggests that a larger set of sample queries should be analyzed in order to obtain more accurate values for average relative increase in recall. However, it should be evident to one of ordinary skill in the art that the recall will generally improve in most cases, and precision can be recovered after query expansion and processing so that the precision is near the point where it was before expansion.

In implementing the search system 10 with a query processing module 30 in accordance with the present invention, the chief limitation uncovered is the computational requirements of the search system 10, and the resulting latency in obtaining the search results. Based on the typical computer hardware that is presently commercially available, the user of the search system 10 may be required to wait for the search system 10 to perform the extensive analysis of the query terms, and candidate synonym words, after the search query is submitted through the user interface module 16. In particular, the latency is due to the fact that the query processing module 30 literally issues many dozens of slightly varying queries, based on the original search query, to the search engine 20, and processes all the results, in order to determine which of the candidate synonym words are contextually qualified equivalents to the original query terms. Of course, this latency will decrease as computer hardware technologies improve and the speed of such hardware correspondingly increase.

To minimize such latency issues, the search system 10 in accordance with the preferred embodiment is implemented to include a query pre-processing module 40. The query pre-processing module 40 stores word set lists in the context database 46 that identify the most popular queries from one or more major online search sites. The word set lists stored in the context database 46 are utilized by the query pre-processing module 40 to determine frequently co-occurring query words. These word sets are pre-processed for context by the query pre-processing module 40 so that terms equivalent to the terms of the original search query (as determined by the prior probability module 36 and the query processing module 30 in the manner discussed above) are already identified and stored within the context database 46.

Correspondingly, when a user of the search system 10 inputs a search query through the user interface module 16, the received query is compared to the word sets (i.e. a combination of words) that are stored in the context database 46. If the received query matches one of these stored word sets, the stored equivalent terms that is stored in the context database 46 which matches the context of the search query is retrieved, and used for submission to the search engine 20 together with the original search query terms. Thus, the computationally intensive processing by the prior probability module 36 and the query processing module 30 at the instant when a search query is submitted by the user is avoided. Of course, it should be noted that not all of the query terms of the query need to be found within a particular word set. Instead, if a particular combination of words are found within the search query, i.e. a subset match, then the pre-analyzed information stored in the context database 46 can be used.

A study of the ten queries above shown in Table 2 revealed that the some of the combination of query terms that are set forth in the original queries would have been pre-processed by the query pre-processing module 40 in the preferred implementation. Table 3 sets forth various word sets that are identified in the word set list stored in the context database 46.

TABLE 3

| Frequently combined query words Pre-processed word combinations found in a word set list |
|---|
| "activities" + "kids" |
| "hiking" + "trails" |
| "Bay" + "area" |
| "missile" + "treaties" |
| "treaties" + "China" |
| "laws" + "marijuana" |

The word combinations in Table 3 account for 11 of 39, or 28%, of the content words, i.e. words kept after "stop words" were discarded, across the first ten sample queries. Thus, a substantial real-time savings could be attained by providing, and utilizing, the query pre-processing module 40 and the context database 46, to pre-analyze such common search query terms. Of course, Table 3 merely provides several combination of words, i.e. word sets, and the actual word sets that are provided in the word set lists stored in the context database 46 would be substantially longer, and set forth the most common combination of query terms that are submitted by the user of search systems. Correspondingly, it should be evident how such larger word set list or lists of word combinations that are pre-processed would greatly enhance obtaining of search results for the user of the search system 10, while minimizing latency and system performance requirements.

It should be noted that there is a complication in using the above noted query pre-processing module 40 and the context database 46 as described above. In particular, it now becomes non-trivial to match the incoming query terms to the word sets of the word set lists stored in the context database 46. In this regard, in Table 3, word combinations ["missile"+"treaties"] and ["treaties"+"China"] both occur, which intersect in respect of the word "treaties." The query pre-processing module 40 of the search system 10 in accordance with the present invention is preferably implemented to utilize the equivalent terms of the context database 46 that are in the intersection of these two word combinations, and not the union thereof. As can be appreciated, this is the more conservative approach for guarding precision of the search results obtained.

It is informative in this regard to examine what this really means in practical terms. In the above discussed example:

1. "Kids" in the context of "hotel" is likely to mean the same as any of "children, youngster, infant, nestling" would mean in the same context, and each of these latter words is not likely to mean anything other than "kid" in that same context.
2. "Kid" in the context of "activity" is likely to mean the same as any of "children, youngster, toddler, infant, jolly" would mean in the same context, and each of these latter words is not likely to mean anything other than "kid" in that same context.
3. Taking "kid" in the presence of both "hotel" and "activity", it is likely to mean the same as any of "children, youngster, infant" (the intersection of No. 1 and No. 1 above). Likewise, these latter words are not likely to mean anything besides "kid" in the same context (i.e. the context of "hotel" and "activity").

The intersection as described in line No. 3 above, does not produce exactly the same equivalent terms as synonyms, as provided in the previously described direct approach when a query pre-processing module 40 and context database 46 is not used. However, the identified equivalent terms are substantially the same. Thus, the latency that would otherwise be experienced by the user of the search system is substantially reduced, while still providing substantially the same equivalent terms that are synonyms to the original search query, which can then be provided to the search engine 20 to increase recall while maintaining precision of the documents retrieved. Moreover, such information can be stored in the context database 46, and can be easily joined together, or otherwise used in other applications in the areas of information retrieval and presentation, including but not limited to, the search system 10 described herein.

In view of the above, it should be evident to one of ordinary skill in the art, how the search system 10 of the present invention reduces the inclusion of irrelevant electronic documents retrieved in response to a search query, while also increasing the number of relevant electronic documents retrieved. Thus, the search system 10 of the present invention increases recall while substantially maintaining precision of search. It should also be evident that another aspect of the present invention is in providing a novel method for enhancing searching in the manner described.

Of course, the above described search system 10 is only one preferred implementation thereof, and the present invention is not strictly limited thereto. The search system 10 of the present invention may also be further modified to utilize meta-tags and ontological classification information that is embedded in many of the search documents, to further refine which of the candidate synonym words are actually equivalent to the original search query terms that can be used to expand the scope of search. The search system 10 may also be implemented to utilize the user's profile and session history as additional clues to the selection of the appropriate equivalent terms in conjunction with the search query. Moreover, in other embodiments, the search system 10 may be implemented to incorporate additional features and functionalities that can enhance the accuracy of the search system 10 in identifying equivalent terms for the search query terms submitted by the user.

In the above regard, as previously described, the calculation of the prior probability score for a candidate synonym word is attained based the prior probability module 36 by examining the word's sense numberings in all four parts-of-speech in WordNet, and also based in the bias as to part-of-speech of the query terms submitted by users, i.e. whether the query terms are Noun, Verb, Adjective, Adverb, etc. Correspondingly, it is important to properly identify the intended part of speech for the search query terms. The selection of equivalent terms that are actually synonyms to the search query terms can be dramatically affected, for good or for ill, by identifying (or misidentifying) the intended parts-of-speech of the original search query terms. Often, some parts-of-speech of a common term are not readily evident to the user of the search system 10, but are nonetheless present in the lexicon. For example, most humans would think of the noun senses for the query "kid pool", e.g. for "kid" the sense of "child" and for "pool" the sense of "swimming pool." However, both words can also be verbs, with substantially different synsets, e.g. "kid" in the sense of "joke, cajole" (as in "Tom likes to kid me a lot") and "pool" in the sense "marshal, gather" (as in "we should pool our resources").

The above noted issues in identifying the correct parts-of-speech can be addressed by tagging and biasing the search system 10 with respect to potential parts-of-speech candidates. In this regard, the search system 10 of the present invention may be implemented with parts-of-speech tagger 50 as shown in FIG. 1, such parts-of-speech taggers being commercially available from $3^{rd}$ parties. The parts-of-speech tagger 50 can be invoked on the search queries to improve the identification of the parts-of-speech for the submitted search query terms, and consequently, used to improve the precision in determining equivalent terms from the candidate synonym words.

Preferably, if a commercially available parts-of-speech tagger is utilized, several modifications should be made due to the special nature of query grammar (or lack thereof), and other constraints of a search application. In particular, search queries submitted to search systems rarely constitute full sentences, and rarely exhibit correct or complete grammar. This is a problem for some parts-of-speech taggers that have been trained on grammatical prose. Thus, if such taggers are used, the parts-of-speech tagger should be retrained with a corpus of actual queries that have been manually sense-tagged, so that the patterns that are typical of queries, can be learned by the parts-of-speech tagger. In other implementations, a rule based parts-of-speech tagger may be used instead. In such an embodiment, the rules of the parts-of-speech tagger should be edited to be more fitting to fragmental text. In this regard, the rules can be modified based on the most common "grammatical" patterns of search engine queries, and different patterns may be weighted in accordance with the frequency ranking of more commonly used query patterns.

Many parts-of-speech tagger are resource intensive. However, a search system 10 that is utilized by end users must perform searches quickly. Considering all of the other computations that must be performed by the search system 10 of the present invention to determine equivalent terms to the query search terms, e.g. stemming, synonym look up, prior probability calculations, Boolean expression construction, etc., the search system 10 cannot afford to spend too much time on any particular step in the analysis process.

On the other hand, many parts-of-speech taggers have an "overkill" of parts-of-speech determination procedures, e.g. recognizing many more parts-of-speech tagger distinctions than are necessary for use in the search system 10. In particular, a full-featured parts-of-speech tagger will typically recognize second-level tags (such as whether a verb is past tense vs. present tense) and other nuances that can add up to more than two hundred tag variations. In contrast, approximately four to ten relevant tags are required to determine the parts-of-speech of search query terms to the level required for accurate elimination of most irrelevant candidate synonym words. Therefore, in the preferred implementation, the parts-of-speech tagger 50 is rule-based and is open to customization, allowing for all of its rules that are not required to be deleted or suppressed. Eliminating such processes that are not required allows the parts-of-speech tagger 50 to execute its tasks much more quickly so as to be more practical for use by the search system 10 of the present invention.

Of course, there are also cases where parts-of-speech issues have less consequence than in other cases. For example, noun and adjective senses of the same word, e.g. "gold", seldom have large semantic differences. Therefore, successfully distinguishing the parts-of-speech in such context is less important than is distinguishing verbs from nouns. Correspondingly, the search system 10 may be implemented so that the parts-of-speech tagger 50 is retrained with only the simplest and most basic rules for distinguishing nouns from adjectives, thus, lightening the analytic depth even further. Thus, a rule-based parts-of-speech tagger can be streamlined until sufficient speed of the search system 10 is attained, e.g. operating within a matter of tens of milliseconds. After such streamlining, the parts-of-speech tagger 50 functions more like a limited version of "parts-of-speech spotters" rather than a full tagger, e.g. noun-spotter, adjective-spotter, and verb-spotter, which could be used instead of a tagger in other implementations of the present invention.

As can be appreciated, when search query terms are expanded to include equivalent terms in the manner described above, many of the search query terms' hyponyms are likely to be included in the search by the query processing module 30. This is a beneficial enhancement to improving recall of the search (e.g. finding "win xp" for the query "operating system"). As a further enhancement, the query processing module 30 of the search system may optionally be implemented to recognize when the user provides a query term (or terms) as a noun modifier that specifies a particular instance or subclass of another query word, and to suppress all hyponyms, or a subset of those hyponyms, that are outside of the class of hyponyms that the user specified. For example, in the query "redhat operating system", the query processing module 30 may be implemented to suppress the hyponym of "win xp" for "operating system" in light of the fact that the user is likely looking for information pertaining to the "redhat" Linux™ operating system in particular.

In some cases, the search system 10 may be presented with a search query that includes a distinctive collocation. A collocation is any set of a plurality of words occurring in sequence in a query (or in a text). Some collocations are actually headwords in a lexicon, e.g. "hot dog". Others have not yet been lexicalized, but are well-established by their repeated use in the language community, and carry a very distinctive meaning, e.g. "cold call" or "armchair quarterback." Ideally they should be treated as headword entries (they are effectively proto-headwords, and most of them eventually will become headwords in the future, as lexicographers catch up with current language practice). In linguistics, these collocations are referred to as "distinctive collocations" because, unlike random or spontaneous collocations, these are in the process of solidifying a place for themselves in the language as having a particular meaning. Collocations which are already headwords in the lexicon are typically referred to as lexical collocations.

In the above regard, an established machine-readable lexicon may contain collocation-headwords. In these cases, a question arises as to whether the constituent words are indeed intended to be a combined pair in the query. A strong bias needs to be in favor of such an intention, but there are cases where it is not. For example, consider "waste paper" in the two queries, "ways to recycle waste paper" and "how to make my printer not waste paper." In this case, a careful interoperation with the parts-of-speech tagger 50 (or verb spotter) is needed, in order to determine that, because "waste" in the second query is a verb, "waste paper" is not a single headword in the second query, though it is in the first query.

Moreover, many of the distinctive collocations should be recognized as a single noun, despite not appearing in the lexicon since most people will find them instantly familiar, despite not being in the dictionary. Examples of such distinctive collocations are "sex change" and "warm-up act". These effectively should be headwords with their own respective meaning, but are not yet in lexicon. From a common-sense point of view, one way to recognize that these collocations need to be treated as single semantic entities is to consider how inappropriate it would be to substitute synonyms individually for each word within them. For example, "intercourse modification" instead of "sex change" would be ridiculous, as would "re-heat action" for "warm-up act." Even changing just one of the synonyms can lead to absurdity: "intercourse change" and "warm-up action" are also inappropriate. However, there are appropriate equivalents for such distinctive collocations, e.g. "sexual modification" for "sex change", which also has "skateboard trick" as a hypernym, in a different sense which is likely to be missing from many standard lexicons that have not bothered to keep up with skateboarding jargon.

In view of the above, the search system 10 in accordance with the preferred embodiment is implemented to cope with such examples of distinctive collocations. In particular, referring again to FIG. 1, the electronic documents 24 of the corpus 22 are analyzed offline by the processor 12 of the search system 10 to identify frequent occurrences of a non-lexical collocation. The search engine 20 is then, utilized to determine if lexical synonyms for the constituent words are being singly substituted with any appreciable frequency in the electronic documents 24 of the corpus 22 itself. In other words, if "intercourse change", along with most of the other similar substitutions, does not occur more often than a tiny fraction of the number of times that "sex change" does, this implies that "sex change" exhibits some specific meaning all its own.

The search system 10 is implemented so that such distinctive collocations are added to a list of para-lexical, distinctive collocations which can be stored in the context database 46, so that they can be readily identified when received as a search query via the user interface module 16. The query processing module 30 of the search system 10 is implemented to treat these para-lexical, distinctive collocations stored in the context database 46, as though they are lexical headwords to thereby suppress their expansion with synonyms/candidate synonym words that will be irrelevant. Of course, optionally, such distinctive collocations can be examined by human editors for possible inclusion in (or rejection from) the official lexicon of the search system 10.

Figure 2:
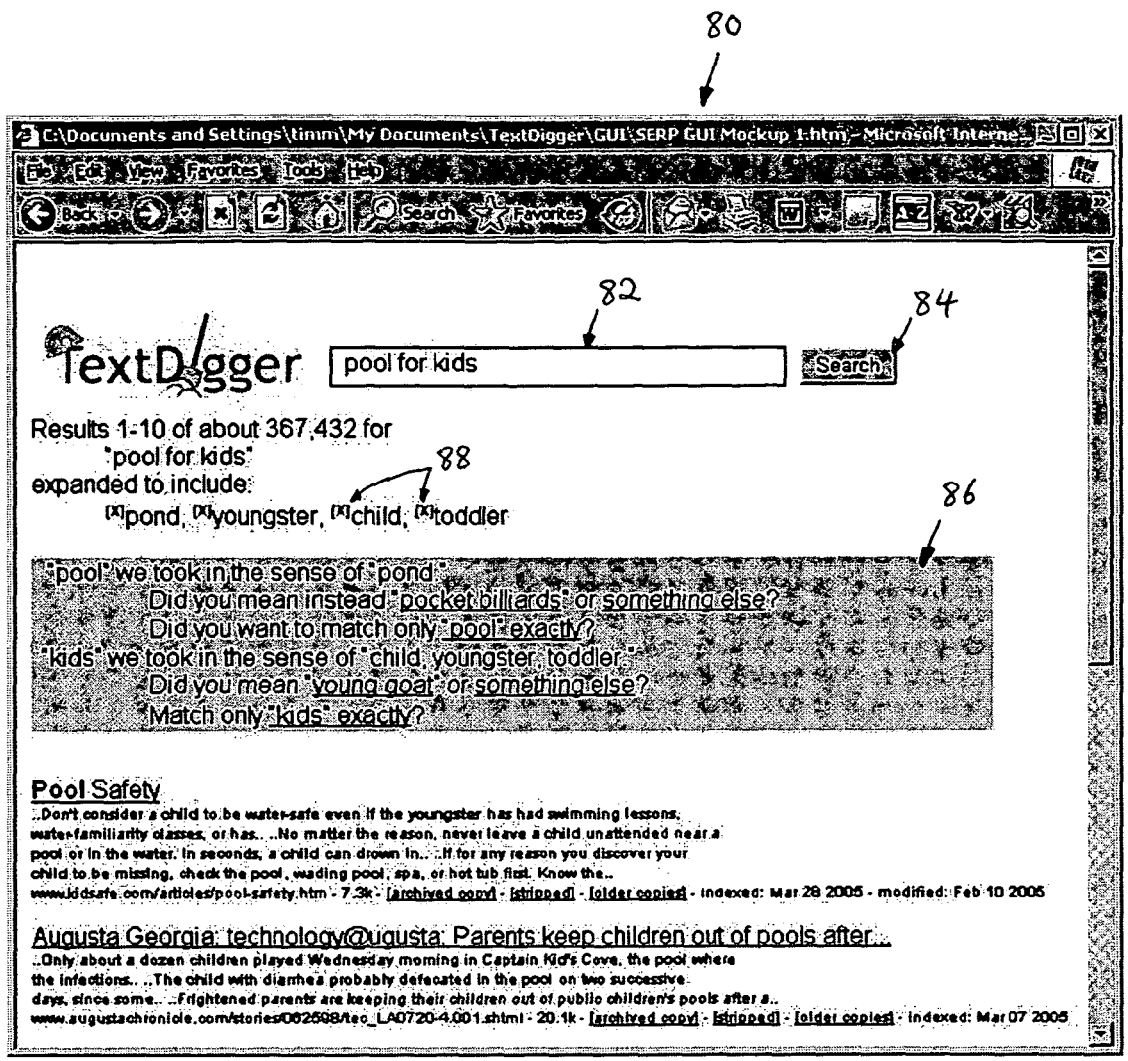
FIG. 2 shows a search screen generated by a user interface module of the search system in accordance with one implementation.

Given the above described features and functionality of the search system 10 in accordance with the preferred embodiment of the present invention, a novel user interface module 16 is also provided in the preferred embodiment to take advantage of such features and functionality. In this regard, FIG. 2 illustrates one example implementation of the graphical user interface (GUI) screen 80 that is generated by the user interface module 16 of the search system 10. As can be seen, a query box 82 is provided for allowing the user to type in the search query, which in the example shown in FIG. 2, is "pool for kids". Upon selection of the Search button 84, the search query is expanded in the manner described above by the query processing module 30 and the prior probability module 36, and the expanded query is submitted to the search engine 20, the results of which are displayed in the GUI screen 80.

In accordance with the present implementation, the GUI screen 80 identifies for the user, equivalent terms to the search query terms as determined by the query processing module 30 and the prior probability module 36 in the manner described above. Thus, as can be seen in FIG. 2, the user is informed that the search query entered was expanded to include the equivalent terms "pond", "youngster", "child", and "toddler". In addition, as shown in the highlighted portion 86 of the GUI screen 80, the user of the search system 10 is informed of the senses for the search query terms, as interpreted by the search system 10. Thus, in the illustrated example, the user is informed that the search query term "pool" was understood in the sense of "pond", and that the search query term "kids" were understood in the sense of "child, youngster, toddler".

Further, the user interface module 16 of the illustrated embodiment is implemented so that the user can suppress the inclusion of any of the expanded equivalent terms that were selected by the query processing module 30 for a given sense of a search query term. This is shown in the GUI screen 80 by selection boxes [x] positioned next to each of the equivalent terms which can be deselected by the user to suppress its inclusion in the search.

Moreover, in accordance with the illustrated implementation, the GUI screen 80 further provides the user with options to allow the user to override the sense selected for each search query term by the search system 10. Thus, in case the search system 10 of the present invention mistakenly construed a user's intent with regard to a collocation (e.g. interpreted "dog fight" to be an aerial military combat when the user could have been referring to a canine altercation), the user interface module 16 is implemented to ask the user "Did you mean [link]?" Conversely, if the query processing module 30 has considered a collocation headword but decided against it, and has opted to present the user with expansions of the search query terms, the user interface module 16 facilitates the user in (1) noticing this, and (2) indicating their intent to have the words treated as a combined, unified semantic element. Again, this may be attained by the user interface module 16 by displaying "Did you mean [link] ?" in such an instance.

Correspondingly, in the example shown in FIG. 2, the GUI screen 80 poses a question that states "Did you mean instead 'pocket billiards' or something else?" As shown, the "pocket billiards" or "something else" alternatives are generated as links that can be selected by the user to override the sense chosen by the search system 10. Thus, upon selection of the "pocket billiards" link informs the search system 10 that the query processing module 30 interpreted the wrong sense for the search query term "pool". Thus, the search is performed again by the search system 10 with the search query term "pool" interpreted in the alternative sense, and expanded to include equivalent terms such as "billiards", "cue", "shark", etc.

Upon selection of the "something else" link, a pop up window may be provided to allow the user to enter other query terms that further disambiguate the sense of the search query terms entered. Thus, in the illustrated embodiment of the GUI screen 80 generated by the user interface module 16, the user can override the query processing module 30, and choose to include equivalent words that may have been ruled out by the query processing module 30 given the query context. In addition, in the presently illustrated embodiment, the user interface module 16 is implemented so that the user can quickly suppress all expansion of the search query terms with equivalent terms by indicating that the user wants to match one or more of the search query terms exactly as also shown in the highlighted portion 86.

As a further variation of the above discussed functionality, the user interface module 16 is further preferably implemented to allow the user to provide an indication that the terms of a proper name is to be searched as separate query terms, thereby overriding the search system's interpretation of the collocation as a proper name. For example, a search querying including "tiger woods" will be interpreted as a proper name of a famous golfer by the query processing module 30. The user interface module 16 preferably allows the user to indicate that the search was actually directed to a wild feline animal "tiger" to be found in "the woods". Such examples are rare but are not difficult to imagine. Another such example is if there is ever a congressman with the surname "Gates" who puts up a "bill" for a vote. There will likely be confusion with "bill gates" or "gates bill" in interpreting the intent of the search query. Correspondingly, the user interface module 16 lets the user know how such collocation was interpreted. For instance, a sentence stating "We assumed you meant [text] but did you mean [link]?" In the manner explained above, the selection of the link of the second field immediately brings up the appropriately modified search.

Moreover, when the query processing module 30 of the search system 10 either de-composes a collocation, or is instructed by the user to de-compose a collocation as described, (e.g. treat "bill gates" as two words), the query processing module 30 is preferably implemented to still output to the search engine 20, the collocation, since it may be used later to filter out, or reduce, the relevance score or ranking of the retrieved electronic documents that exhibit usage of the words as a collocation (e.g. words "bill" and "gates" found in an electronic document with "Bill Gates" in a non-title case sentence).

It should also be noted that utilization of the "Did you mean [link]?" type sentences are used in many search engines to present correct spellings mistyped search query terms. However, the implementation of the present invention is substantially different in that these sentences and the links presented to the user therein address semantic variance, and allow the user to clarify the intent of the search query. Of course, in other embodiments of the present invention, the user interface module 16 may be implemented with other features as well that provide different functionality than that described above.

Many important features as well as option features of the search system 10 in accordance with the present invention has been described and discussed in detail above. However, it should be evident to one of ordinary skill in the art that the search system 10 of the present invention is not limited thereto, and can be provided with additional features and functionality. For instance, conventional keyword search engines generally discard words that are considered to be of little value, and are usually expensive to index due to high frequency (e.g. "the", "a", etc.). In the preferred implementation, the search system 10 does not discard stop-words, since they may be crucial in identifying distinctive or lexical collocations as well as proper names as discussed above, e.g. "on the run" or "the rolling stones". Correspondingly, the query processing module 30 utilizes such stop-words when they are deemed part of a proper name, or a distinctive collocation so that equivalent terms are not forced upon the search engine 20 which does not correspond to the distinctive collocation. This may be attained by adding scope delimiters that signal to the search engine 20 that such words are not be discarded and are searched for as a single lexical unit (i.e. a "phrase" search).

Furthermore, most conventional search engines typically treat a search query in a case-insensitive manner. However, use of upper case is a very helpful hint in spotting proper names in text found in documents, users of search systems cannot be expected to type search queries using proper case. Correspondingly, in accordance with the another embodiment, the query processing module 30 is implemented so that if the search query is entered into the user interface module 16 in non-uniform case (i.e. not all upper or lower case), the query processing module 30 is adapted to take the query case into consideration as a clue for detecting proper names and determining word grouping and sense selection. In such an embodiment, the search system 10 is implemented to call up a proper-name identification tool or a named entity extraction (NEE) engine, to aid in identification of proper-names, such tools or engines being already available in the industry.

It should also be appreciated that many electronic thesauri have a very granular sense breakdown for some words. If the candidate synonym words for the search system 10 are obtained from such electronic thesauri, this can cause problems because it presents too many almost-indistinguishable senses. It also increases the possibility of the query processing module 30 missing equivalent terms found in other sense (s) that might be helpful in expanding the original search query, especially since it would be difficult to select all relevant equivalent terms when selecting only one sense to use for expansion.

In many instances, for the purposes of searching, these granular sense breakdowns are not necessary or desirable. Hence, the lexicon that is used by the query processing module 30 is preferably pre-processed offline in order to combine senses that exhibit very little semantic difference. The way this can be accomplished is by determining overlap in equivalent words of both senses, and comparing senses to other lexicons, dictionaries and thesauri. If a lower number of senses are observed in these other resources, then some senses in the lexicon can likely be combined. Similarly, if equivalent words that occur in two senses from the lexicon are mentioned in a single sense in one or more of the other resources, then this also gives an indication that the two senses can be merged together. Of course, a tool for manually marking senses from the source lexicon to combine may be provided to ensure accurate detection and safe merging of the word senses.

As with all search systems implemented to retrieve documents over the WorldWideWeb, there is an on-going concern with adult content/pornographic materials. Presently, commercially available content filters are often used at the post processing stage to prevent unintentional or unauthorized viewing of such materials. Of course, ideally, the search system 10 of the present invention is implemented to not show any pornographic results to search queries that are not intended toward pornography, while also not censoring pornographic materials from search queries that are actually looking for such material.

Pornography is of special concern to the search system 10 of the present invention because as explained above, the search system 10 is provided with various features that expand the original search query terms to include additional equivalent terms. Such added equivalent terms may unintentionally lead to additional results which may be pornographic in nature, and a post processing filter may not be in use to filter out such results. Therefore, in accordance with the preferred embodiment of the present invention, the search system 10 is implemented with a filtering module 60 described in detail below that suppresses pornographic documents only if it is determined that the search query is not directed to pornographic material.

Filtering a list of potentially pornographic words is not as simple as having a stop-word list containing words commonly used in pornographic electronic documents. If the filtering module 60 of the search system 10 was implemented to simply discard all such words, this would lead to both false positives and false negatives. One the one hand, pornographic websites are getting clever about avoiding the blatantly pornographic language, expressly for the purpose of circumventing such filters. Meanwhile, non-pornographic sites can utilize many of the same words as the pornography sites, but combined differently. One need only consider the metaphorical language used in pornographic material that has legitimate usage in construction and home improvement sites, e.g. a hardware store's website will contain the words "nail" and "screw" and "wet."

Because of these complexities, the filtering module 60 of the search system 10 in accordance with the preferred embodiment is implemented with a point-system (or a weighting system) wherein some words are assigned a full 1.0 score for being definitely pornographic (a fairly short list of words), and many other words are given a score between 0 and 1. These assigned points corresponding to the search query terms are processed by the filtering module 60, for example, added together. If the total score for all the search query terms remain below a predetermined (configurable) threshold, the search system 10 considers the query to be non-pornographic, and correspondingly, suppresses the query processing module 30 from generating pornographic synonyms. Of course, the processing performed by the filtering module 60 may be more elaborate in other implementations, for example, divide the added points by the number of search terms to derive an average, and require the calculated average to be above a predetermined threshold for the search query to be directed to pornographic material.

Of course, if the search query includes a word that has an explicitly pornographic sense in the lexicon, which is contextually indicated by other clues within the query, e.g. co-occurrence of words as described above, or the query contains pornographic phrases, then the search query can be considered to be directed to pornographic material, and correspondingly the filtering module 60 does not suppress the pornographic results which is retrieved based on the expanded search query.

All of the above noted user activity using the user interface module 16 is preferably logged, including the sequence in which the user altered the query expansion, and which search results were clicked on. This logged information is very valuable and can be processed offline and made available to the query processing module 30, including:

Original query, normalized to sense tags in order to facilitate lookups when synonyms are used.

Original sense that was selected by the query processing module, and sense that was ultimately selected by the user.

Equivalent terms that were eliminated manually by the user

Equivalent terms that were matches in the search result summaries that were clicked on by the user.

All of these statistics can be recorded with counts, and compiled periodically from the logs by the processor 12 of the search system 10. Preferably, only statistically significant user feedback is presented to the query processing module 30 to save time and processing requirements, and any contradictory trends are resolved offline. The statistics can then be incorporated into how the search system 10 conducts searches for a user, for example, by modifying or biasing the final confidence score or the prior probability score. In this regard, strong patterns (i.e. across many contexts) in user sense and term selection may be used to permanently restructure the lexicon by demoting the dominance of a certain sense over another, as well as reducing or eliminating a candidate synonym word that was thought to be equivalent in a given sense.

Finally, it should be further noted that whereas the above description of the present invention focused on the search system 10 shown in FIG. 1, the present invention is not limited thereto. Another aspect of the present invention is in providing a novel computer implemented method for searching electronic documents, and providing a search result in response to a search query in the manner discussed above. In addition, yet another aspect of the present invention is in providing a computer readable media having instructions for executing the search system and/or method described herein.

Figure 3:
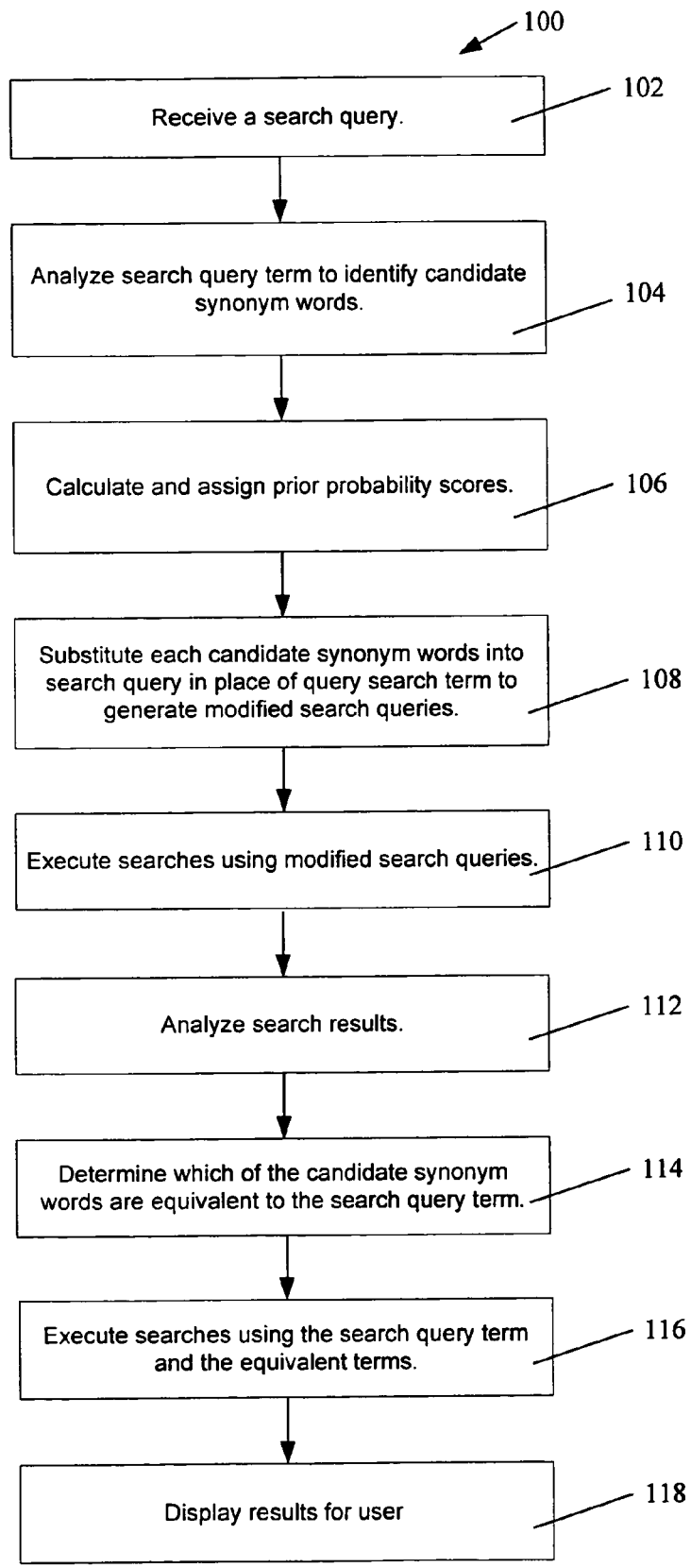
FIG. 3 is a schematic flow diagram of a method in accordance with one embodiment of the present invention.

In the above regard, FIG. 3 shows a schematic flow diagram 100 of a method in accordance with one embodiment of the present invention. As can be seen, in accordance with the illustrated method, a search query is received from a user in step 102, the search query having at least one search query term. In step 104, the search query term is analyzed to identify candidate synonym words for the search query term. In step 106, prior probability scores are calculated and assigned to the candidate synonym words based on a likelihood of each candidate synonym word being used in an equivalent manner as the search query term. As described above, the calculation and assignment of the prior probability scores to the candidate synonym words may be based at least partially on distribution of senses of the search query term, and/or part-of-speech bias.

Referring again to the flow diagram 100, the illustrated method further includes step 108 where each of the candidate synonym words are substituted into the search query in place of the query search term to generate modified search queries. These modified search queries are provided to a search engine in step 110, the search engine executing a search using these modified search queries. The results of the search are analyzed in step 112 to determine which of the candidate synonym words yielded multiple matches in semantically continuous segments retrieved by the search engine, and also attested by at least two electronic documents.

In step 114, a determination is made as to which of the candidate synonym words are equivalent terms to the at least one search query term, and in a same sense as the search query term as used in the search query. As discussed in detail above, this determination may be based on the prior probability scores, and/or on whether the candidate synonym words yield multiple matches in semantically continuous segments retrieved by the search engine, and attested by at least two electronic documents. In step 116, the search query term and the determined equivalent terms are provided to a search engine, and a search is performed. The results of the expanded search are displayed for the user in step 120.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

We claim:

1. A search system for searching for electronic documents, and providing a search result in response to a search query, comprising:

a processor;

a user interface module adapted to receive a search query from a user, said search query having at least two original search query terms;

a query processing module that analyzes at least one original search query term of the at least two original search query terms to identify candidate synonym words for said at least one original search query term, and determines which of said candidate synonym words are equivalent terms to said at least one original search query term, wherein equivalent terms are candidate synonym words that are used in a same sense as said at least one original search query term is used in said search query;

wherein said query processing module substitutes at least one of said candidate synonym words into said search query in place of said at least one original query search term to generate a modified search query, and a search engine executes a search using said modified search query, and wherein said query processing module determines which of said candidate synonym words are equivalent terms to said at least one original search query term based at least partially on which of said candidate synonym words are located together with at least one of the other at least two original search query terms in semantically continuous segments retrieved by said search engine using said modified search query.

2. The search system of claim 1, wherein said query processing module determines which of said candidate synonym words that are equivalent terms to said at least one search query term based at least partially on how many documents in which said candidate synonym words are found together in semantically contiguous segments.

3. The search system of claim 1, further including a query pre-processing module which determines co-occurring words in popular queries and stores the determined co-occurring words in at least one word set list, wherein said pre-processing module determines equivalent terms to said co-occurring query words of said at least one word set list.

4. The search system of claim 3, wherein said query pre-processing module retrieves said determined equivalent terms in response to co-occurring query words being submitted as a search query.

5. The search system of claim 4, wherein said query pre-processing module retrieves an intersection of said determined equivalent terms if a plurality of co-occurring query words are submitted as a search query.

6. The search system of claim 1, wherein said use interface module is adapted to display said candidate synonym words that are determined to be equivalent terms to said at least one original search query term.

7. The search system of claim 6, wherein said user interface module is adapted to allow at least one of said equivalent terms to be suppressed from being used by said search engine.

8. The search system of claim 1, wherein said use interface module is adapted to display a user selectable alternative sense for said at least one original search query term.

9. The search system of claim 1, further including a filtering module adapted to analyze said search query to determine whether said search query is directed to pornography, and block pornographic electronic documents if said search query is determined to be not directed to pornography.

10. A computer implemented method for searching electronic documents, and providing a search result in response to a search query, comprising:
  receiving a search query from a user, said search query having at least two search query terms;
  analyzing at least one search query term of said at least two search query terms to identify candidate synonym words for said at least one search query term;
  substituting at least one of said candidate synonym words into said search query in place of said at least one query search term to generate a modified search query;
  executing a first search using said modified search query;
  determining which of said candidate synonym words are equivalent terms to said at least one search query term, wherein equivalent terms are candidate synonym words that are used in a same sense as said at least one search query term is used in said search query based at least partially on which of said candidate synonym words are located together with at least one of the other search query terms in semantically continuous segments retrieved by said search engine using said modified search query in said first search; and
  executing a second search using said at least one search query term and said equivalent terms.

11. The method of claim 10, wherein executing the search using said at least one search query term and said candidate synonym words comprises executing the search using said modified search query.

12. The method of claim 10, wherein said determination of which of said candidate synonym words are equivalent terms to said at least one search query term is based at least partially on how many documents in which said candidate synonym words are found together in semantically contiguous segments.

13. The method of claim 12, further including calculating and assigning prior probability scores to said candidate synonym words which reflects a likelihood of each candidate synonym word being used in an equivalent manner to said at least one search query term, wherein said determination of which of said candidate synonym words are equivalent terms to said at least one search query term is further based on said prior probability scores.

14. The method of claim 10, further including determining co-occurring query words in popular queries, storing the determined co-occurring words in at least one word set list, and determining equivalent terms to said co-occurring query words of said at least one word set list.

15. The method of claim 14, further including retrieving said determined equivalent terms in response to co-occurring query words being submitted as a search query.

16. The method of claim 15, further including retrieving an intersection of said determined equivalent terms if a plurality of co-occurring query words are submitted as a search query.

17. The method of claim 10, further including displaying for the user, said candidate synonym words that are determined to be equivalent terms to said at least one search query term.

18. The method of claim 17, further including suppressing at least one of said equivalent terms from being used by said search engine.

19. The method of claim 10, further including displaying a user selectable alternative sense for said at least one search query term.

20. The method of claim 10, further including analyzing said search query to determine whether said search query is directed to pornography, and blocking pornographic electronic documents if said search query is determined to be not directed to pornography.

21. Computer readable media with executable instructions physically stored thereon which cause a computer system to carry out a method when executed, the method comprising:
  receiving a search query from a user, said search query having at least two search query terms;
  analyzing said at least two search query terms to identify candidate synonym words for at least one of said at least two search query terms;
  substituting at least one of said candidate synonym words into said search query in place of said at least one query search term to generate a modified search query;
  executing a first search using said at least one search query term and said modified search query;
  determining which of said candidate synonym words are equivalent terms to said at least one search query term, wherein equivalent terms are candidate synonym words that are used in a same sense as said at least one search query term is used in said search query based at least partially on which of said candidate synonym words is found together with at least one of the other search query terms in semantically continuous segments retrieved by said search engine using the modified search query in said first search;
  executing a second search using said at least one search query term and said equivalent terms.

22. The computer readable media of claim 21, further comprising substituting each of said candidate synonym words into said search query in place of said at least one query search term to generate modified search queries, and wherein executing the search using said at least one search query term and said candidate synonym words comprises executing searches using said modified search queries.

23. The computer readable media of claim 21, further comprising determining which of said candidate synonym words are equivalent terms to said at least one search query term based at least partially on how many documents in which said candidate synonym words are found together with said at least one search query term in semantically contiguous segments.

24. The computer readable media of claim 23, further comprising calculating and assigning prior probability scores to said candidate synonym words which reflects a likelihood of each candidate synonym word being used in an equivalent manner to said at least one search query term, and determining which of said candidate synonym words are equivalent terms to said at least one search query term based on said prior probability scores.

25. The computer readable media of claim 21, further comprising determining co-occurring query words in popular queries, storing the determined co-occurring words in at least one word set list, and determining equivalent terms to said co-occurring query words of said at least one word set list.

26. The computer readable media of claim 25, further comprising retrieving said determined equivalent terms in response to co-occurring query words being submitted as a search query.

27. The computer readable media of claim 26, further comprising retrieving an intersection of said determined equivalent terms if a plurality of co-occurring query words are submitted as a search query.

28. The computer readable media of claim 21, further comprising displaying for the user, said candidate synonym words that are determined to be equivalent terms to said at least one search query term.

29. The computer readable media of claim 28, further comprising suppressing at least one of said equivalent terms from being used by said search engine.

30. The computer readable media of claim 21, further comprising displaying a user selectable alternative sense for said at least one search query term.

31. The computer readable media of claim 21, further comprising analyzing said search query to determine whether said search query is directed to pornography, and instructions for blocking pornographic electronic documents if said search query is determined to be not directed to pornography.

\* \* \* \* \*